(12) United States Patent
Zhang et al.

(10) Patent No.: US 12,149,306 B2
(45) Date of Patent: Nov. 19, 2024

(54) SYSTEMS AND METHODS FOR ROBUST CSI FEEDBACK

(71) Applicant: APPLE INC., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Seyed Ali Akbar Fakoorian, San Diego, CA (US); Sigen Ye, San Diego, CA (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/359,103

(22) Filed: Jul. 26, 2023

(65) Prior Publication Data

US 2023/0370127 A1 Nov. 16, 2023

Related U.S. Application Data

(63) Continuation of application No. 17/593,256, filed as application No. PCT/CN2021/076748 on Feb. 18, 2021, now Pat. No. 11,831,371.

(51) Int. Cl.
*H04L 5/12* (2006.01)
*H04B 7/0456* (2017.01)
(Continued)

(52) U.S. Cl.
CPC ......... *H04B 7/0456* (2013.01); *H04B 7/0639* (2013.01); *H04L 1/0026* (2013.01); *H04L 1/0029* (2013.01)

(58) Field of Classification Search
CPC ... H04B 7/0456; H04B 7/0639; H04L 1/0026; H04L 1/0029
(Continued)

(56) References Cited

U.S. PATENT DOCUMENTS 8,442,448 B2   5/2013   Kim et al.
8,913,574 B2   12/2014  Chen et al.
(Continued)

FOREIGN PATENT DOCUMENTS

CN   107408965    * 11/2017
CN   109586775 A    4/2019
(Continued)

OTHER PUBLICATIONS

U.S. Appl. No. 17/593,256, Notice of Allowance, Aug. 29, 2023, 8 pages.
(Continued)

*Primary Examiner* — Helene E Tayong
(74) *Attorney, Agent, or Firm* — Dorsey & Whitney LLP

(57) ABSTRACT

Systems and methods disclosed herein use channel state information (CSI) reports from a user equipment (UE) having additional CSI beyond CSI directly derived according to a current MIMO configuration between a base station and the UE. In some embodiments, a channel quality indicator (CQI) according to a selected layer of a plurality of layers used to receive the MIMO transmission as determined relative to the MIMO transmission is reported. In some embodiments, a precoding matrix indicator (PMI) according to a selected layer of a plurality of layers useable to receive rank 1 transmissions is reported along with a CQI determined according to that layer, or according to a layer used to receive the MIMO transmission as determined relative to the MIMO transmission. In some embodiments, a base
(Continued)

station configures a UE to report more fulsome CSI according to each of a plurality of ranks.

19 Claims, 15 Drawing Sheets

(51) Int. Cl.
*H04B 7/06* (2006.01)
*H04L 1/00* (2006.01)

(58) Field of Classification Search
USPC ............................................. 375/262
See application file for complete search history.

(56) References Cited

U.S. PATENT DOCUMENTS

| | | | |
|---|---|---|---|
| 9,681,425 B2 | 6/2017 | Geirhofer et al. | |
| 10,985,824 B2* | 4/2021 | Jin | H04B 7/0639 |
| 11,277,179 B2* | 3/2022 | Nammi | H04B 7/0634 |
| 2012/0320862 A1 | 12/2012 | Ko et al. | |
| 2016/0013852 A1 | 1/2016 | Lee et al. | |
| 2018/0351612 A1 | 12/2018 | Kim et al. | |

FOREIGN PATENT DOCUMENTS

| | | |
|---|---|---|
| CN | 111327352 A | 6/2020 |
| WO | 2019056292 A1 | 3/2019 |
| WO | 2019139985 A1 | 7/2019 |

OTHER PUBLICATIONS

PCT/CN2021/076748, International Search Report and Written Opinion, Oct. 26, 2021, 9 pages.
U.S. Appl. No. 17/593,256, Non-Final Office Action, Apr. 27, 2023, 11 pages.
Moderator (Intel Corporation), "Summary #3 of email discussions for [101-e-Post-NR-52_71_GHz]", R1-2005193, 3GPP TSG RAN WG1 Meeting #101-E, e-Meeting, Agenda Item 8.1, May 25-Jun. 5, 2020, 46 pages.

* cited by examiner

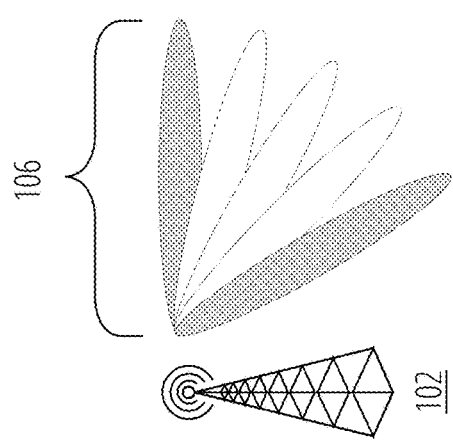
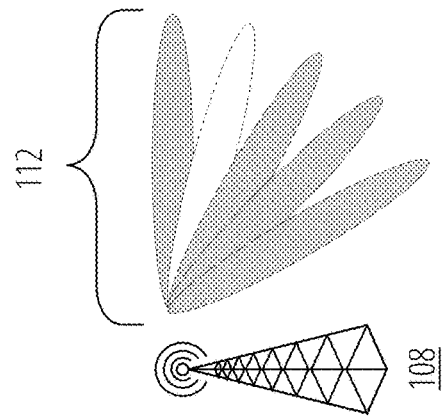
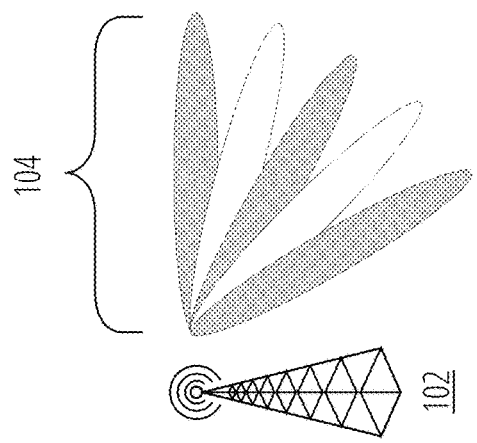
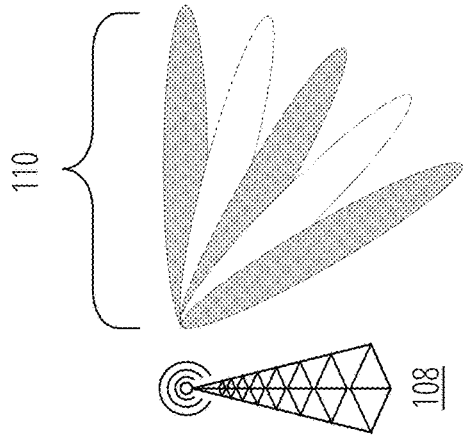
FIG. 1A
FIG. 1B

SYSTEMS AND METHODS FOR ROBUST CSI FEEDBACK

TECHNICAL FIELD

This application relates generally to wireless communication systems, including the use of channel state information (CSI) reports having CSI beyond CSI directly derived according to a current multiple input multiple output (MIMO) configuration between a base station and a user equipment (UE).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A illustrates a base station changing a rank used for MIMO transmission, according to an embodiment.

FIG. 1B illustrates a base station changing a rank used for MIMO transmission, according to an embodiment.

FIG. 3 illustrates the selection of multiple precoders for calculating multiple CQI according to individual layers of a plurality of layers used to receive a MIMO transmission, according to an embodiment.

FIG. 7 illustrates a pair of methods for selecting a precoder for calculating CQI to be paired with a PMI determined according to a selected layer of a plurality of layers useable to receive transmissions from the base station as determined relative to the possible rank 1 transmissions on those useable layers, according to embodiments described herein.

DETAILED DESCRIPTION

Figure 2:
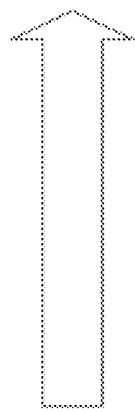
FIG. 2 illustrates the selection of a precoder for calculating a CQI according to a selected layer of a plurality of layers used to receive a MIMO transmission, according to an embodiment.

Modern wireless communications systems may use multiple input multiple output (MIMO) methods. In these methods, a transmission from a base station to a user equipment (UE) may use multiple antennas at the base station, and the reception of the transmission at the UE may use multiple antennas at the UE. This use of multiple antennas at the base station and the UE allows for increased data rates through a physical channel by leveraging spatial multiplexing. In one example of spatial multiplexing, in a downlink direction, a first data stream comprising one or more symbols transmitted using one or more antennas of the base station may travel to a first antenna of the UE using a first path within the channel and to a second antenna of the UE using a second path within the channel. A second data stream (that may contain data symbols that are different from those of the first) transmitted by one or more antennas of the base station may travel to the first antenna of the UE using a third path within the channel and to the second antenna of the UE using a fourth path. Each of these two data streams (as received according to the four data paths) may occur on a transmission "layer" of the MIMO transmission that is accordingly received at the UE on the UE antennas in the manner described. While this example describes the use of two transmission layers (each having a respective transmission data stream), the number of transmission layers may, in other cases, be 2, 4, 8, 16, or some other number of layers.

If the two layers appear at the receive (Rx) antennas of the UE as sufficiently spatially distinct (e.g., via operation/use of different weights at each transmit (Tx) antennas for each layer and/or by separately beam steering each layer at the transmitter), such that each respective data stream is discernable according to the layer upon which it has been sent, the UE can, by decoding across its multiple antennas relative to each such layer used in the base station transmission, receive each data stream (on each layer) at the same time.

The number of layers that can be/that is being used to send/receive a MIMO transmission may be understood to be a "rank" associated with the MIMO transmission. The maximum rank (number of layers) useable for reception of a MIMO transmission at a UE is equivalent to the number of antenna at the UE. The maximum rank (number of layers) useable for a MIMO transmission by the base station is equivalent to the number of (logical) antenna ports used by the base station. In some embodiments, the maximum rank of a MIMO transmission between such a UE and base station is the lower of these two numbers.

A transmission direction used for a layer as sent by the base station and/or a reception direction used for a layer as received by the UE may be set and/or modified across the multiple antenna of the transmitting device by using a precoder that establishes the appropriate transmission/reception characteristic of each transmission antenna relative to the layer with which the precoder is associated (e.g., the use of the precoder may be a form of digital beamforming for the associated layer). Analogous, corresponding precoders may be accordingly configured for use at the transmitting device and the receiving device. A precoder may be, for example, a vector having an element representing the characteristic or weight for each of the antennas of the device relative to the associated layer. A plurality of such precoders according to the number of layers being used at the device may be represented in a matrix form as a precoder matrix, as will be shown below.

Because the positioning of the UE relative to the base station is in a large number of cases not static, coordination between the UE and the base station may be used in order to set up and/or update an appropriate number of transmission layers (an appropriate transmission rank) relative to the nature of the specific physical channel between the base station and the UE and/or to set up a correspondence regarding precoders that are to be used. One way to perform this coordination is through channel state information (CSI) reports.

For example, A CSI report may be sent from a UE to a base station. Such a CSI report may include one or more metrics regarding the state of the channel between the UE and the base station. The reporting of the CSI by the UE (and the subsequent use of the CSI by the base station) allows the base station to adapt one or more aspects of the transmissions to the UE based on the reported metrics.

In some embodiments, the one or more metrics of a CSI report may include a channel state information resource index (CRI). A CRI may be used at the base station to select a beam index corresponding to a preferred beam on the channel between the UE and the base station.

In some embodiments, the one or more metrics of a CSI report may include a rank indicator (RI). An RI may be used to indicate a number of layers for which a UE can receive a transmission from a base station without undue interference between the layers. For example, if a UE under a MIMO configuration can receive a MIMO transmission using four layers without undue interference between the various layers, the UE may send a RI with a value of four to the base station as part of a CSI report made by the UE to the base station.

In some embodiments, the one or more metrics of a CSI report may include a precoder matrix indicator (PMI). A PMI may indicate to a base station a recommended precoder matrix to use in order direct the MIMO transmission appropriately. The PMI may correspond to the rank of the MIMO transmission (e.g., the PMI may indicate the use of a precoder matrix that is for use according to the rank of the MIMO transmission).

In some embodiments, the one or more metrics of a CSI report may include a layer indicator (LI). An LI may indicate the strongest layer within the MIMO transmission as determined relative to the MIMO transmission (e.g., as impacted by the interference effects caused by other active layers of MIMO transmission, in the case of a multi-rank MIMO transmission). If the rank being reported by the UE is one (e.g., RI=1), this parameter may be omitted from CSI.

In some embodiments, the one or more metrics of a CSI report may include one or more channel quality indicator (CQIs). This may be a value that represents an overall or holistic view of the quality of the physical channel. In some cases, that calculation of a CQI may take into account one or more layers being used/currently active in the MIMO transmission. The CQI may be based at least in part on a CRI, RI, and/or PMI that may also be being determined by the UE in the manner described above. The CQI may be used to determine a modulation and coding scheme (MCS) that will be used by the base station and/or the UE when performing the associated MIMO transmission(s). In the case where the reported rank is greater than four (RI>4), CQI for both a first and a second codeword may be reported in the CSI report.

In various embodiments, a CSI report may be made by a UE on a physical uplink control channel (PUCCH) (either long PUCCH or short PUCCH), or a CSI report may be made by the UE on a physical uplink shared channel (PUSCH). In the case of a CSI report using a short PUCCH, the CSI may be reported in a single part. In the case of a CSI report using either long PUCCH or PUSCH, the CSI report may be reported in multiple parts. In some cases, the multiple parts may correspond to a first part having CRI, RI and a CQI for a first codeword, and a second part having PMI, LI, and a CQI for a second codeword.

FIG. 1A illustrates a base station 102 changing a rank used for MIMO transmission, according to an embodiment. In the example of FIG. 1A, the 102 changes (or wants to change) from using the rank 3 MIMO transmission 104 to instead using the rank 2 MIMO transmission 106.

FIG. 1B illustrates a base station 108 changing a rank used for MIMO transmission, according to an embodiment. In the example of FIG. 1B, the base station 108 changes (or wants to change) from the rank 3 MIMO transmission 110 to using instead the rank 4 MIMO transmission 112.

A base station (such as the base station 102 or the base station 108) that has been transmitting to a UE using a MIMO transmission of a first rank may need to change to transmit to that UE using a MIMO transmission of a second rank for a variety of reasons. For example, it may be that a MIMO transmission rank used to communicate with a UE may need to be lowered (as in, e.g., FIG. 1A) to free up spatial resources for a second UE that is communicating with the base station. In another example, a retransmission from the base station to the UE may need to use a different (higher or lower, as in FIG. 1A and FIG. 1B respectively) rank. This may be because the transmission with the different rank is a retransmission of an (earlier) transmission that was sent according to the different rank than a rank currently being used. In these cases, the base station uses the same rank in order to keep the same transport block (TB) size in the retransmission as the earlier transmission, where the TB size is determined by number of resource elements, the modulation and coding scheme, and the number of layers. Thus, base station should keep consistent rank for both the initial (earlier) transmission and retransmission to make sure the TB size should be the same.

However, a CSI report received at a base station (such as the base station 102 or the base station 108) may contain one or more metrics (e.g., CRI/RI/PMI/LI/CQI) taken according to the layers of the present MIMO transmission (or according to the rank of the present MIMO transmission). For example, a CQI calculated while the base station 102 performs the rank 3 MIMO transmission 104 may reflect, among other things, interferences as between the various layers being used as part of the rank 3 MIMO transmission 104. A CQI calculated according to a different rank would have a different interference profile (due to fewer or more layers being used) and thus the reported CQI is valid only as to the current rank 3 MIMO transmission 104. As another example, a PMI determined while the base station 102 is performing the rank 3 MIMO transmission 104 may indicate to a precoder matrix of rank 3, corresponding to the number of layers currently being used. In this case, the values in the precoder vectors of the indicated matrix may not account for the changed channel conditions/interference profile under a MIMO transmission of a lower or higher rank. As another example, an LI calculated while the base station 102 performs the rank 3 MIMO transmission 104 may reflect the active layer within the MIMO transmission with a highest determined signal-to-noise ratio (SINR) of the plurality of layers used to receive the MIMO transmission and as determined relative to the MIMO transmission. Because this value is determined corresponding to the interference profile generated as to the currently active layers in the current MIMO transmission, it is not (necessarily) valid/mappable to a MIMO transmission of a different rank using a different number of active layers and having a different interference profile.

Accordingly, in order to provide the base station with information relevant to MIMO transmissions of other ranks that may be used between the base station and the UE, it is useful to configure a UE to determine and report additional CSI beyond the CSI taken according to the layers of the present MIMO transmission (e.g., CSI beyond CSI determined according to all active layers of the current MIMO transmission).

In some embodiments, the UE may be configured to report CSI that is determined according to a (single) selected layer of the plurality of layers used to receive the MIMO transmission as determined relative to the MIMO transmission. For example, the UE may be configured to determine and report a CQI determined according to reception aspects on the selected layer of the layers used to receive the MIMO transmission (rather than a CQI corresponding to reception aspects across all layers being used to receive the MIMO transmission as a whole). This CQI may give the base station some understanding of the corresponding layer (on an individual basis, and not relative to interference caused by the other active layers), which may then allow the base station to make determinations whether to, for example, use a MIMO transmission of a different rank but with the same or spatially similar layer (e.g., a rank 1 MIMO transmission that uses this or a spatially similar layer). The calculation of such a non-relative CQI during a multi-rank MIMO transmission may done by using, at the UE, the precoder associated with the individual layer to calculate this CQI (rather than using the entire precoder matrix having precoders for all of the currently active layers to calculate CQI). The UE may use CSI-RS signals from the base station (which may not have been precoded by the base station) to perform this calculation. For example, the UE estimates the channel based on the CSI-RS signals. Then the precoder associated with each of one or more individual layers is used with the channel estimation to determine the characteristics of that layer in the current channel (e.g., SINR, spectrum efficiency, received power, etc). Examples of a spectrum efficiency metric as discussed herein may be calculated, for example, using a Shannon equation, where the spectrum efficiency is log 2(1+SINR). Other methods of calculating a spectrum efficiency are contemplated.

FIG. 2 illustrates the selection of a precoder for calculating a CQI according to a selected layer of a plurality of layers used to receive a MIMO transmission, according to an embodiment. FIG. 2 includes a rank 4 precoder matrix 202 that may correspond to a current precoder matrix being associated with a current rank 4 transmission.

In the example of FIG. 2, layer 0 (having a precoder 204 that is the first column of the rank 4 precoder matrix 202, as modified by the ¼ out front) has been selected as the subject for calculating this CQI value. Layer 0 may have been so selected because it was the layer of the plurality of layers used to receive the MIMO transmission (the active layers at the UE of the MIMO transmission) with a highest SINR of the layers used to receive the MIMO transmission. This layer may be, for example, the layer indicated by LI (LI=0) for CSI determined according to all the layers used to receive the MIMO transmission, in the manner described above (e.g., where LI was determined relative to the MIMO transmission with respect to all layers of the MIMO transmission being active).

In other cases, layer 0 may have been so selected for corresponding to the highest raw RX power of the layers used to receive the MIMO transmission. Again, this determination may have been made within the MIMO transmission with respect to all layers of the MIMO transmission being active.

Accordingly to this selection, the UE selects the precoder 204 for use in calculating the CQI relative to (only) the layer associated with the precoder 204 (as compensated by ½ out front to account for the changed scaling as compared to the calculation of a CQI using the entire rank 4 precoder matrix 202.

Once calculated, the UE may report this CQI (in addition to any other CSI that was determined according to all the layers used to receive the MIMO). Note that in FIG. 2, a matrix for a four rank MIMO transmission is used by way of example: any multi-rank MIMO transmission currently received at the UE could be similarly analyzed to determine a precoder in the manner described.

In some embodiments, the CQI determined according to the single layer may be reported as an absolute CQI. In other embodiments, this CQI may be reported based on a differential CQI reporting method, with the reference CQI being a CQI that was instead determined according to all the layers used to receive the MIMO transmission. The differential CQI reporting method may report an index corresponding to a value for the change in the CQI as compared to the reference CQI (which may require relatively fewer bits to indicate), rather than a direct CQI index (which may require relatively more bits to indicate).

The CQI that is determined according to the selected layer of the plurality of layers used to receive the MIMO transmission (rather than relative to all layers of the active MIMO transmission) may be determined (and from there reported) in a subband manner (e.g., over a subband of the bandwidth part (BWP) used by the MIMO transmission), rather than in a wideband manner (e.g., over the entire BWP). Reporting this CQI in a wideband manner may save signaling and/or processing resources as compared to the subband manner case.

In some embodiments, this type of CQI may be determined and reported both in a wideband manner and in a subband manner. For example, an absolute wideband CQI associated with the selected precoder may be generated reported, and further differential subband CQI(s) generated using the precoder over one or more subbands may be generated and reported (as related to the absolute wideband CQI, and provided, for example, using the differential CQI index scheme described above).

In some examples, higher layer signaling from the base station may instruct the UE whether to determine and report this CQI in a wideband manner and/or in a subband(s) manner. The higher layer signaling from the base station may also indicate whether to use absolute and/or differential value(s) in the manner described above. These configurations may be provided to the UE using common RRC signaling or by using separate RRC signaling.

In some embodiments, a list of more than one CQI that is determined according to various individual layers of the plurality of layers used to receive the MIMO transmission (rather than relative to all layers of the active MIMO transmission) may be determined and reported by the UE. This may help the base station account for multiple different interference hypothesis when, for example, it comes to multi user (MU) pairing in a MU-MIMO context.

The use of more than one such CQI may be motivated by the recognition that depending on the decision from a MU-MIMO scheduler of the base station, the reported precoder may be paired with other precoders for other users. In this case, the channel may not be perfectly orthogonal. Hence, the pairing of the other uses will impact the CQI of any single CQI that is determined according to an individual layer of the plurality of layers used to receive the MIMO transmission. In this case, it may be beneficial for the UE to report multiple hypotheses/CQI regarding all of these layers.

Figure 3:
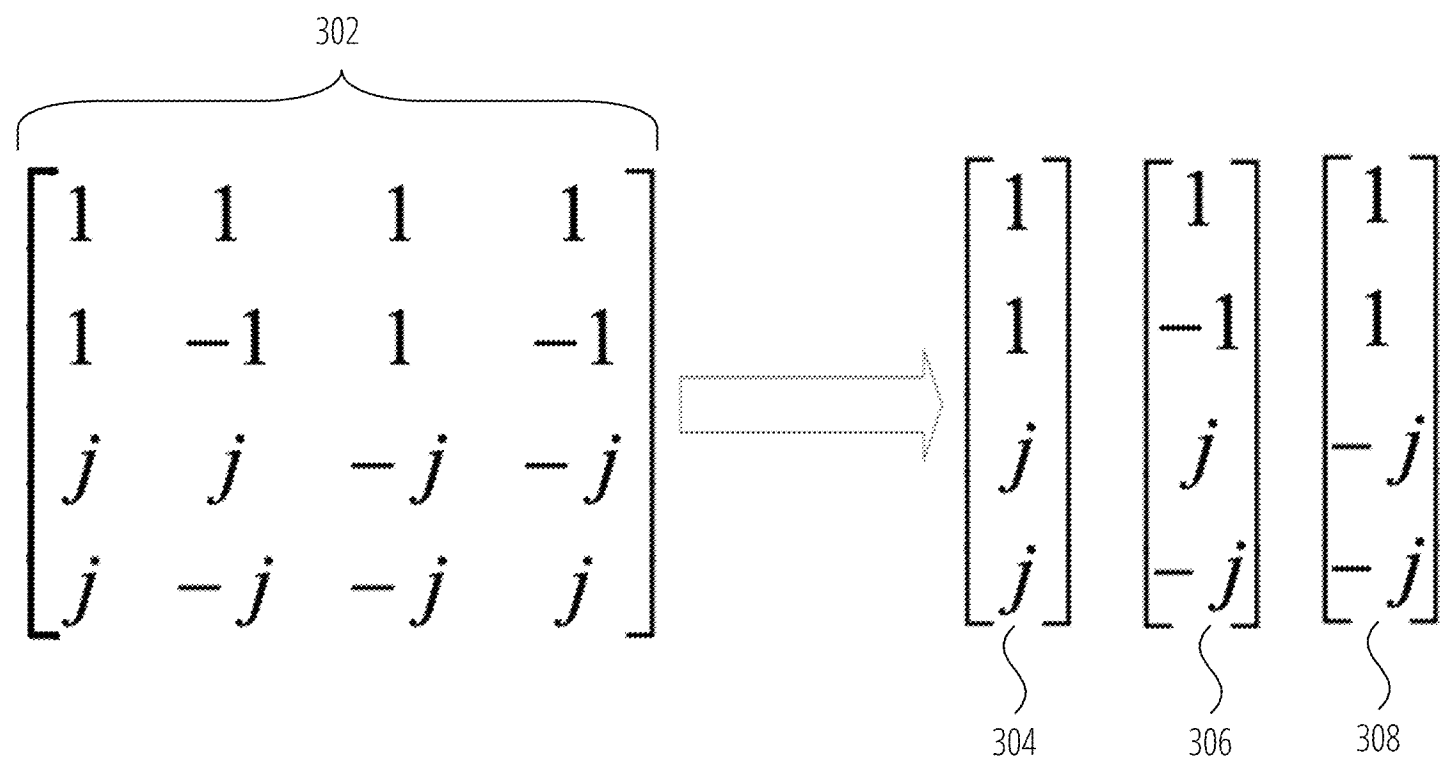

FIG. 3 illustrates the selection of multiple precoders for calculating multiple CQI according to individual layers of a plurality of layers used to receive a MIMO transmission, according to an embodiment. FIG. 3 includes a rank 4 precoder matrix 302 that may correspond to a current precoder matrix being used to perform a rank 4 transmission. In FIG. 3, the first precoder 304, the second precoder 306, and the third precoder 308 (respectively corresponding to the layer 0, layer 1, and layer 2 of the rank for transmission) have been selected from/taken from the rank 4 precoder matrix 302. The UE may use each of the first precoder 304, the second precoder 306, and the third precoder 308 individually to calculate a CQI according to the respective layers. These CQI values may be reported to the base station as part of a CSI report.

In some embodiments, the selection of the layers for which to calculate these CQI values may include the layer with a highest SINR of the layers used to receive the MIMO transmission (as determined relative to the MIMO transmission) in the manner described above. Additional layers selected may be the layers with the next highest SINR determined under the same circumstances. In another embodiment, the selection of the layers for which to calculate these CQI values may include the layer(s) that support highest spectrum efficienc(ies) used to receive the MIMO transmission in the manner described above.

The one (as in FIG. 2) or more (as in FIG. 3) CQI values may be included in a CSI report that is sent to the base station on one of a long PUCCH, a short PUCCH, and a PUSCH. When the CSI report is made on a short PUCCH, these CQI value(s) may be reported along with any CSI metrics (CRI/RI/PMI/LI/CQI) determined according to all the layers used to receive a MIMO transmission from a base station in a single part. When the CSI report is made on a long PUCCH or a PUSCH, these CQI value(s) may be reported in a part of the CSI report that includes only some of the CSI metrics (CRI/RI/PMI/LI/CQI) determined according to all the layers used to receive the MIMO transmission. For example, these CQI value(s) may be reported in a part of the CSI report that also includes a PMI, LI, and a CQI determined according to all the layers used to receive the MIMO transmission.

The foregoing embodiments described in relation to FIG. 2 and FIG. 3 may be applicable in cases where the rank of the MIMO transmission from the base station is greater than one (in other words, in cases where more than one layer is being used for the MIMO transmission). Stated another way, in cases where the rank of the MIMO transmission is one, the UE may not perform/may not be configured/instructed to perform the CQI calculations according to individual layer(s) of the plurality of layers used to receive a MIMO transmission (and/or to include such CQI calculations in a CSI report) in the manner described in relation to FIG. 2 and FIG. 3.

Figure 4:
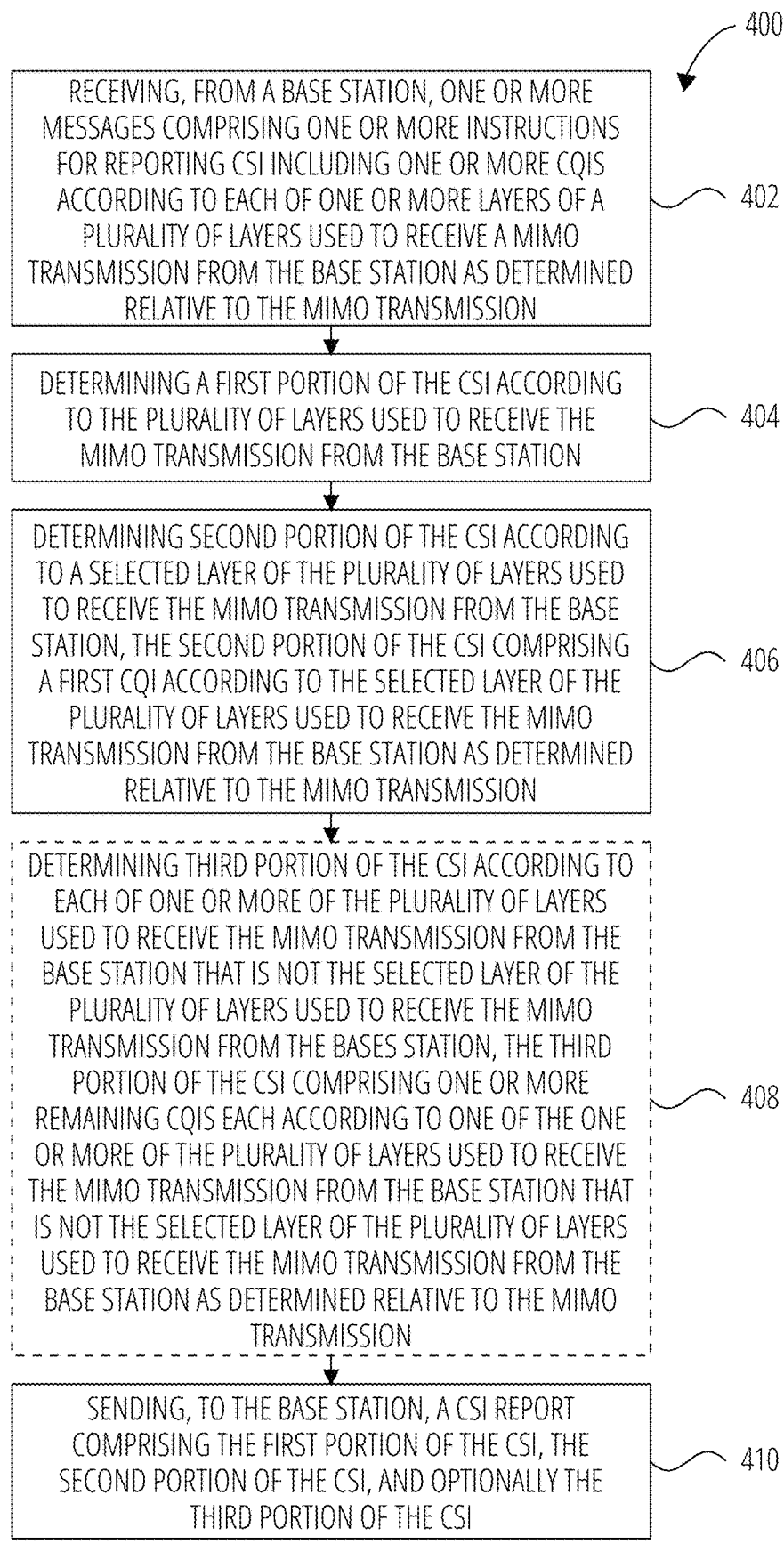
FIG. 4 illustrates a method of CSI reporting at a UE, according to an embodiment.

FIG. 4 illustrates a method 400 of CSI reporting at a UE, according to an embodiment. The method 400 includes receiving 402, from a base station, one or more messages comprising one or more instructions for reporting CSI including one or more CQIs according to each of one or more layers of a plurality of layers used to receive a MIMO transmission from the base station as determined relative to the MIMO transmission. The one or more instructions may inform the UE of the number of layers of the plurality of layers on which to report, the manner of reporting on each of the one or more layers (e.g., whether/for which layers to report an absolute CQI and/or differential CQI), the band applicability for each of the layers (e.g., whether to report for each layer in a subband(s) manner and/or a wideband manner), etc. The one or more messages may be sent, for example, as common RRC signaling or in separate RRC signaling.

The method 400 further includes determining 404 a first portion of the CSI according to the plurality of layers used to receive the MIMO transmission from the base station.

The method 400 further includes determining 406 a second portion of the CSI according to a selected layer of the plurality of layers used to receive the MIMO transmission from the base station, the second portion of the CSI comprising a first CQI according to the selected layer of the plurality of layers used to receive the MIMO transmission from the base station as determined relative to the MIMO transmission. This determination may be made according to the one or more instructions received from the base station.

The method 400 further optionally includes determining 408 a third portion of the CSI according to each of one or more of the plurality of layers used to receive the MIMO transmission from the base station that is not the selected layer of the a plurality of layers used to receive the MIMO transmission from the base station, the third CSI comprising one or more remaining CQIs each according to one of the one or more of the plurality of layers used to receive the MIMO transmission from the base station that is not the selected layer of the plurality of layers used to receive the MIMO transmission from the base station as determined relative to the MIMO transmission. This determination may be made if the one or more instructions from the base station call for it, and, if made, may be made in the manner described in the one or more instructions from the base station.

The method 400 further comprises sending 410, to the base station, a CSI report comprising the first portion of the CSI, the second portion of the CSI, and optionally the portion of the third CSI. The third portion of the CSI may be included in the CSI report to the base station in embodiments of the method 400 where the determining 408 the third portion of the CSI was previously performed.

In some embodiments of the method 400, the selected layer of the plurality of layers used to receive the MIMO transmission from the base station is a layer of the plurality of layers used to receive the MIMO transmission with a highest determined SINR of the plurality of layers used to receive the MIMO transmission from the base station as determined relative to the MIMO transmission.

In some embodiments of the method 400, the first CQI according to the selected layer of the plurality of layers used to receive the MIMO transmission is determined using a precoder for the selected layer of the plurality of layers used to receive the MIMO transmission.

In some embodiments of the method 400, the first CQI according to the selected layer of the plurality of layers used to receive the MIMO transmission is an absolute CQI.

In some embodiments of the method 400, the first CQI according to the selected layer of the plurality of layers used to receive the MIMO transmission is a differential CQI determined relative to a second CQI according to the plurality of layers used to receive the MIMO transmission that is included in the first portion of the CSI.

In some embodiments of the method 400, the first CQI according to the selected layer of the plurality of layers used to receive the MIMO transmission is reported in a wideband manner.

In some embodiments of the method 400, the first CQI according to the selected layer of the plurality of layers used to receive the MIMO transmission is reported in one of a wideband manner and a subband manner according to a configuration from the base station.

In some embodiments of the method 400, the CSI report is sent to the base station in first and second parts on one of a long PUCCH and a PUSCH, and one of the first and second parts comprises the first CQI according to the selected layer of the plurality of layers used to receive the MIMO transmission and one or more of a CQI, a PMI, and an LI from the first portion of the CSI.

Embodiments contemplated herein include an apparatus comprising means to perform one or more elements of the method 400. This apparatus may be, for example, an apparatus of a UE 1200 as described below.

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, the memory 1206 of the UE 1200 described below, and/or the peripheral devices 1504, the memory/storage devices 1514, and/or the databases 1520 of the components 1500 as described below.

Embodiments contemplated herein include an apparatus comprising logic, modules, or circuitry to perform one or more elements of the method 400. This apparatus may be, for example, an apparatus of a UE 1200 as described below.

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE 1200 as described below.

Embodiments contemplated herein include a signal as described in or related to one or more elements of the method 400.

Embodiments contemplated herein include a datagram, packet, frame, segment, protocol data unit (PDU), or message as described in or related to one or more elements of the method 400.

Embodiments contemplated herein include a signal encoded with data as described in or related to one or more elements of the method 400.

Embodiments contemplated herein include a signal encoded with a datagram, packet, frame, segment, PDU, or message as described in or related to one or more elements of the method 400.

Embodiments contemplated herein include an electromagnetic signal carrying computer-readable instructions, wherein execution of the computer-readable instructions by one or more processors is to cause the one or more processors to perform one or more elements of the method 400.

Embodiments contemplated herein include a computer program comprising instructions, wherein execution of the program by a processing element is to cause the processing element to carry out one or more elements of the method 400. These instructions may be, for example, the instructions processor 1508 and/or the instructions 1512 of the components 1500 as described below.

Figure 5:
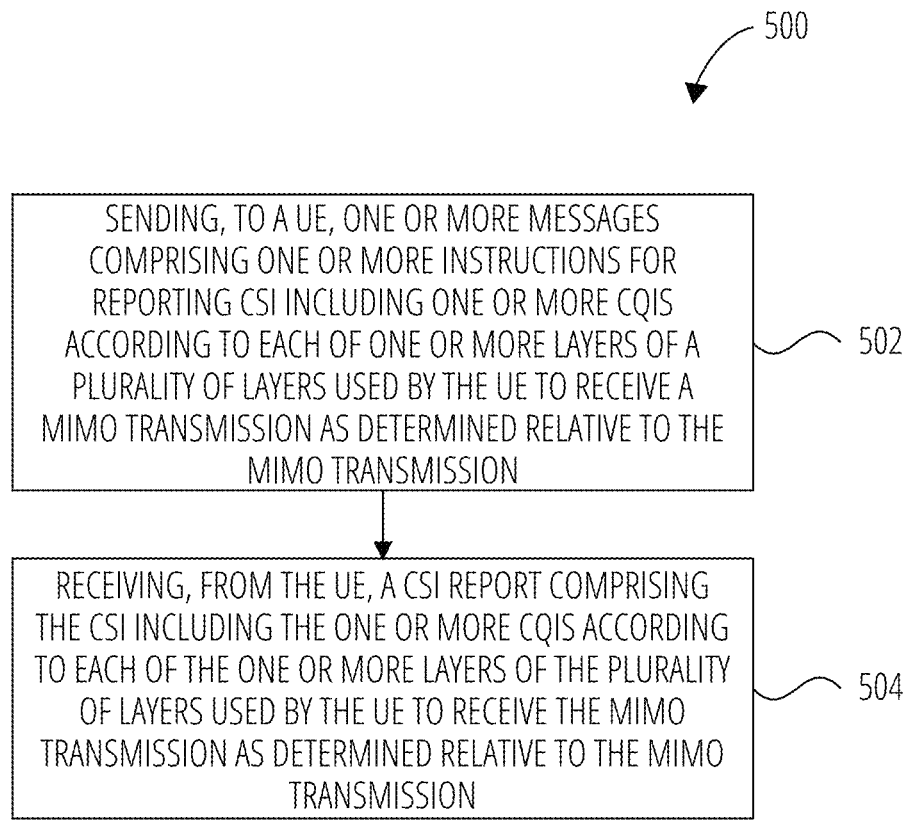
FIG. 5 illustrates a method of a base station for configuring CSI reporting at a UE, according to an embodiment.

FIG. 5 illustrates a method 500 of a base station for configuring CSI reporting at a UE, according to an embodiment. The method 500 includes sending 502, to a UE, one or more messages comprising one or more instructions for reporting CSI including one or more CQIs according to each of one or more layers of a plurality of layers used by the UE to receive a MIMO transmission as determined relative to the MIMO transmission. The one or more instructions may inform the UE of the number of layers of the plurality of layers on which to report, the manner of reporting on each of the one or more layers (e.g., whether/for which layers to report an absolute CQI and/or differential CQI), the band applicability for each of the layers (e.g., whether to report for each layer in a subband(s) manner and/or a wideband manner), etc. The one or more messages may be sent, for example, as common RRC signaling or in separate RRC signaling.

The method 500 further includes receiving 504, from the UE, a CSI report comprising the CSI including the one or more CQIs according to each of the one or more layers of the plurality of layers used by the UE to receive the MIMO transmission as determined relative to the MIMO transmission. The CSI may include the one or more CQIs determined by the UE in the manner described above and as instructed by the base station during the sending 502. This CSI report may also include CSI according to the plurality of layers used by the UE to receive a MIMO transmission.

In some embodiments of the method 500, the CSI report is received from the UE in first and second parts on one of a long PUCCH and a PUSCH. In some of these embodiments, one of the first and second parts comprises the CQI according to the selected layer of the plurality of layers used to receive the MIMO transmission and one or more of a CQI, a PMI, and an LI determined according to the plurality of layers used by the UE to receive the MIMO transmission as determined relative to the MIMO transmission.

In some embodiments of the method 500, the CSI report is received from the UE in a single part on a short PUCCH.

Embodiments contemplated herein include an apparatus comprising means to perform one or more elements of the method 500. This apparatus may be, for example, an apparatus of a network node 1300 as described below.

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, the memory 1306 of the network node 1300 described below, and/or the peripheral devices 1504, the memory/storage devices 1514, and/or the databases 1520 of the components 1500 as described below.

Embodiments contemplated herein include an apparatus comprising logic, modules, or circuitry to perform one or more elements of the method 500. This apparatus may be, for example, an apparatus of a network node 1300 as described below.

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a network node 1300 as described below.

Embodiments contemplated herein include a signal as described in or related to one or more elements of the method 500.

Embodiments contemplated herein include a datagram, packet, frame, segment, protocol data unit (PDU), or message as described in or related to one or more elements of the method 500.

Embodiments contemplated herein include a signal encoded with data as described in or related to one or more elements of the method 500.

Embodiments contemplated herein include a signal encoded with a datagram, packet, frame, segment, PDU, or message as described in or related to one or more elements of the method 500.

Embodiments contemplated herein include an electromagnetic signal carrying computer-readable instructions, wherein execution of the computer-readable instructions by one or more processors is to cause the one or more processors to perform one or more elements of the method 500.

Embodiments contemplated herein include a computer program comprising instructions, wherein execution of the program by a processing element is to cause the processing element to carry out one or more elements of the method 500. These instructions may be, for example, the instructions processor 1508 and/or the instructions 1512 of the components 1500 as described below.

Disclosure above related FIG. 2 through FIG. 5 describes, in some embodiments, the reporting of one or more CQI corresponding to, a layer (or, in some cases, more than one layer) with, for example, a highest determined SINR (or highest received power) of the plurality of layers used to receive the MIMO transmission as determined relative to the MIMO transmission (e.g., during a multi-rank MIMO transmission). However, the fact that this layer/these layers has/have, for example, the highest SINR as determined relative to a multi-rank MIMO transmission (where other layers are also active) does not (necessarily) mean that such a layer would have the highest SINR of all possible rank 1 MIMO transmissions. This may be due to the fact that the set of layers used in the MIMO transmission included only layers other than/not corresponding to the best rank 1 layer, as a result of properly balancing inter-layer interference considerations, providing proper layer separation, etc.

Figure 6:
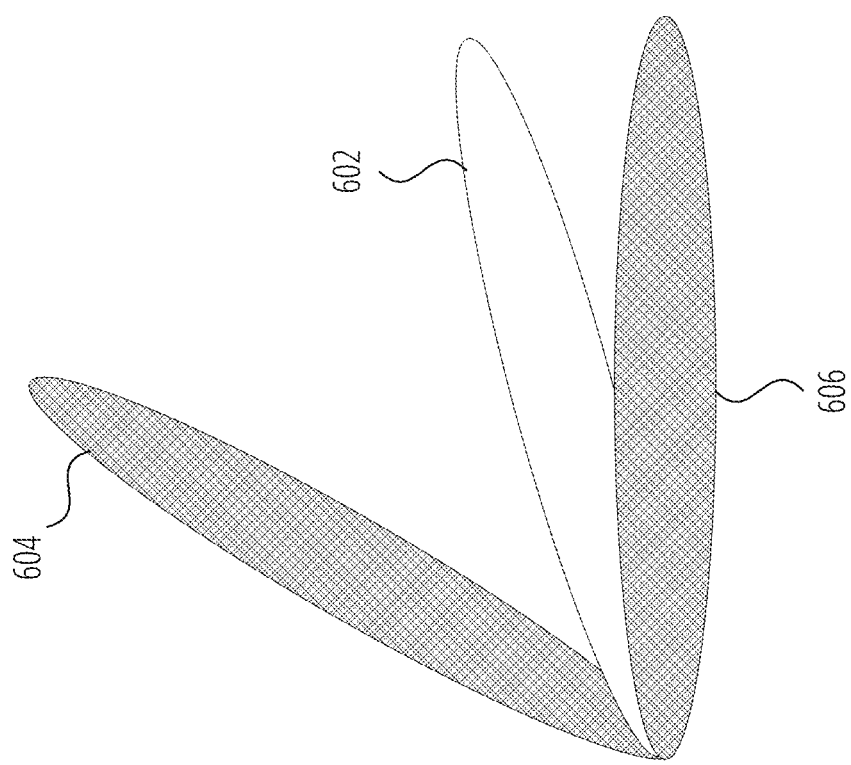
FIG. 6 illustrates an example of a rank 1 layer with a highest SINR (or highest received power) out of the set of all rank 1 layers that is different than a layer of a multi-rank MIMO transmission that has the highest SINR out of the layers of a MIMO transmission as determined relative to the MIMO transmission, according to an embodiment.

FIG. 6 illustrates an example of a rank 1 layer with a highest SINR (or highest received power) out of the set of all rank 1 layers that is different than a layer of a multi-rank MIMO transmission that has the highest SINR out of the layers of a MIMO transmission as determined relative to the MIMO transmission, according to an embodiment. It may be that the first layer 602 corresponds to a layer of a rank 1 transmission that has a highest SINR (or highest Rx power) out of all layers possible to be used for rank 1 transmissions, while the second layer 604 and the third layer 606 correspond to layers of a rank 2 transmission, with the second layer 604 having the highest SINR out of the pair as determined relative to the MIMO transmission.

Accordingly, it is contemplated that a base station may configure a UE to report a PMI according to a selected layer of a plurality of layers useable to receive rank 1 transmissions from the base station as determined relative to the possible rank 1 transmissions on those useable layers. This additional information may allow the base station to further consider the use of these rank 1 layers.

The UE may perform the determination by testing all possible rank 1 layer vectors of a rank one codebook with the current transmission from the base station, and proceeds to select the PMI according the vector from the codebook that gives the best result. To perform this test, the UE may test each such vector with a CSI-RS signal that is sent by the base station. The selected PMI is then reported to the base station. In some embodiments, the selected layer for which the PMI is sent may be the layer of the plurality of layers useable to receive rank 1 transmissions from the base station with the highest signal-to-noise ratio (SINR) during this test. In other embodiments, the selected layer for which the PMI is sent may be the layer of the plurality of layers useable to receive rank 1 transmissions from the base station with a highest spectrum efficiency, or a highest received power.

In some embodiments, the PMI can be reported in a wideband manner (e.g., over the entire BWP used between the base station and the UE). In other cases, higher layer signaling from a base station may instruct the UE whether to report the PMI in the wideband manner or in a subband manner (e.g., over a subband BWP used between the base station and the UE). This wideband/subband indication for this PMI (and perhaps other PMI to be included in the CSI report) may be based on common signaling (e.g., common RRC signaling) or on separate signaling (e.g., separate RRC signaling).

Figure 7:
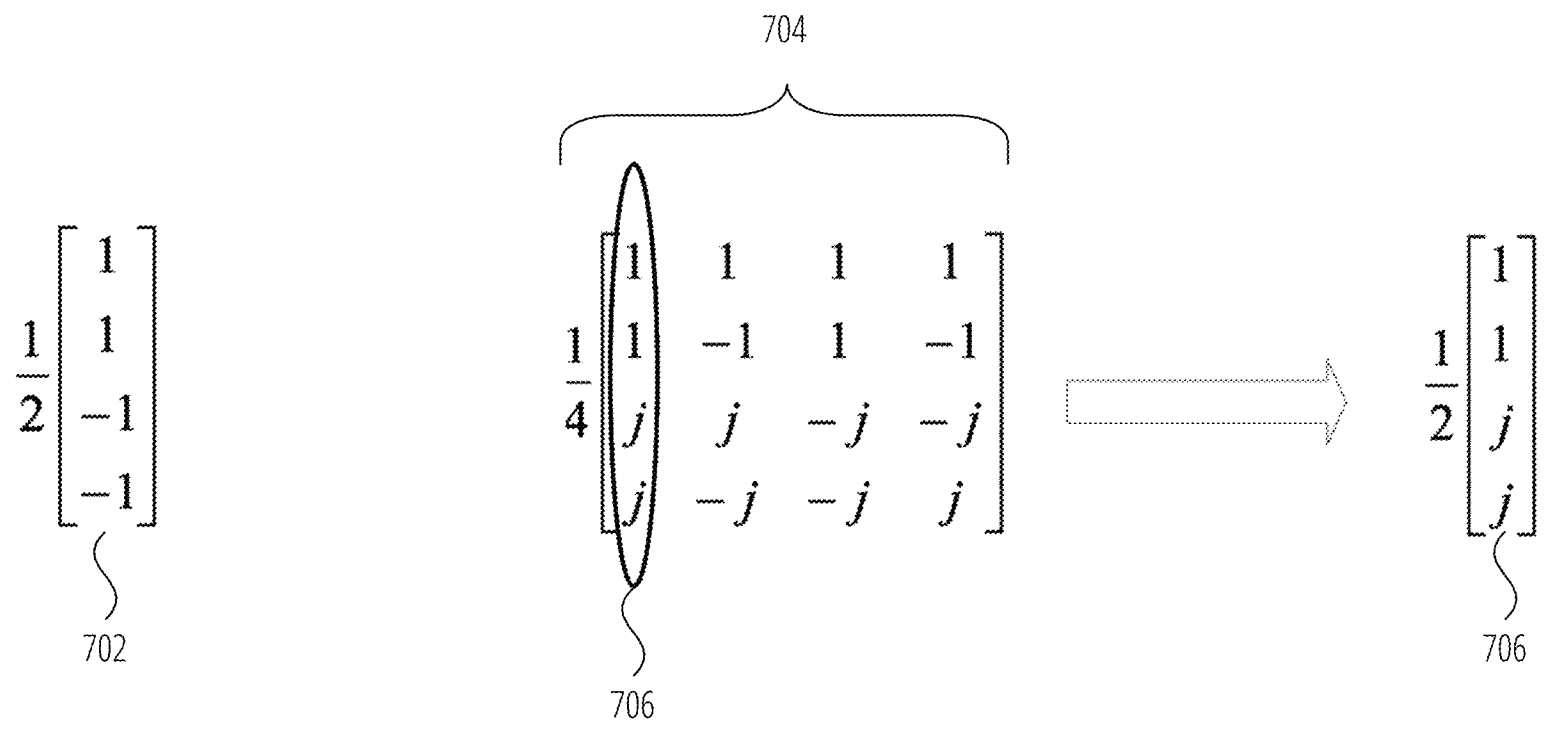

FIG. 7 illustrates a pair of methods for selecting a precoder for calculating CQI to be paired with a PMI determined according to a selected layer of a plurality of layers useable to receive rank 1 transmissions from the base station, according to embodiments described herein. FIG. 7 shows the rank 1 precoder 702 indicated by such a PMI. The PMI indicates only a single (appropriately scaled) precoder (rather than a matrix of precoders), due to the PMI corresponding to a layer for a rank 1 transmission. In some instances, this is the precoder that will be used to calculate CQI that is to be sent in the CSI report along with the PMI according to the selected rank 1 layer.

FIG. 7 also illustrates a rank 4 precoder matrix 704. In some embodiments where the PMI according to the selected rank 1 layer is to be indicated to the base station in a CSI report, it may be that the UE calculates CQI using a precoder for a selected layer of the plurality of layers used to receive the multi-rank (rank four) MIMO transmission as determined relative to the multi-rank MIMO transmission, in the manner described in FIG. 2. In the example of FIG. 7, the multi-rank precoder 706 may be selected in this case. The multi-rank precoder 706 may have been selected for being associated with the layer of the plurality of layers used to receive the multi-rank MIMO transmission with, e.g., a highest determined signal-to-noise ratio (SINR) of the plurality of layers used to receive the multi-rank MIMO transmission as determined relative to the multi-rank MIMO transmission, and subsequently appropriately scaled, as described above in relation to FIG. 2. Note that in FIG. 7, a matrix for a four rank MIMO transmission is used by way of example: any multi-rank MIMO transmission currently received at the UE could be similarly analyzed to determine a precoder in the manner described.

It may be that in some cases, the UE may dynamically determine whether to send CQI calculated using the rank 1 precoder 702 associated with the PMI according to the layer for the rank 1 transmission or CSI calculated using the multi-rank precoder 706 according to the selected layer of the plurality of layers used to receive the multi-rank MIMO transmission as determined relative to the multi-rank MIMO transmission. This determination may be based on whether the CSI report to be sent comprises a LI according to the plurality of layers used to receive the MIMO transmission from the base station, in the manner described above. If this LI is present, the multi-rank precoder 706 of the rank 4 precoder matrix 704 may be used to calculate the CQI to send along with the PMI according to the selected rank 1 layer. Otherwise, if the LI is not present, the rank 1 precoder 702 may be used to calculate the CQI to send along with the PMI according to the selected rank 1 layer.

In some cases, the selection may be made instead according to spectrum efficiency. In these cases, if the LI is present, the corresponding spectrum efficiency for the rank 4 precoder matrix 704 indicated by the CSI may have been calculated, and UE only needs to calculate the spectrum efficiency for the rank 4 precoder matrix 704 according to the LI based on the spectrum efficiency for the rank 4 precoder matrix 704 *r* as well as a scaling factor. Therefore, if the LI is reported, to reduce UE complexity, the CQI can be calculated by precoder indicated by the LI. If the LI is not reported, UE can calculate the CQI based on the rank 1 precoder 702 associated with the PMI. As described above, in some embodiments, for UE complexity reduction, the PMI may be selected based on the receiving signal power instead of spectrum efficiency.

The CSI report that includes the PMI according to the selected rank 1 layer and the attendant CQI (determined as just described) may be reported in one of a short PUCCH, a long PUCCH, and a PUSCH. If this CSI report is provided in a short PUCCH, the PMI according to the selected rank 1 layer and its attendant CQI may be reported together with any other CSI (e.g., CRI/RI/PMI/LI/CQI determined according to all the layers used to receive the MIMO transmission) a in a single part in the CSI report. If this CSI report is provided in a long PUCCH or a PUSCH, the CSI report is sent in two parts, and there may accordingly be two options for arranging the PMI according to the selected rank 1 layer and the attendant CQI. In a first option, the PMI according to the selected rank 1 layer and the attendant CQI are sent in a first of the two parts with one or more of a CQI, a PMI, and an LI determined according to the layers used to receive the MIMO transmission. In a second option, the PMI according to the selected rank 1 layer and the attendant CQI are sent in a second of the two parts with one or more of a CQI, a CRI, and an RI determined according to the layers used to receive the MIMO transmission.

The foregoing embodiments described in relation to FIG. 6 and FIG. 7 may be applicable in cases where the rank of the MIMO transmission is greater than one (in other words, in cases where more than one layer is being used for the MIMO transmission). Stated another way, in cases where the rank of the MIMO transmission is already one, the UE may not perform/may not be configured/instructed to perform the PMI determinations for rank 1 layers/the attendant CQI calculations (and/or to include such items in a CSI report) in the manner described in relation to FIG. 6 and FIG. 7.

Figure 8:
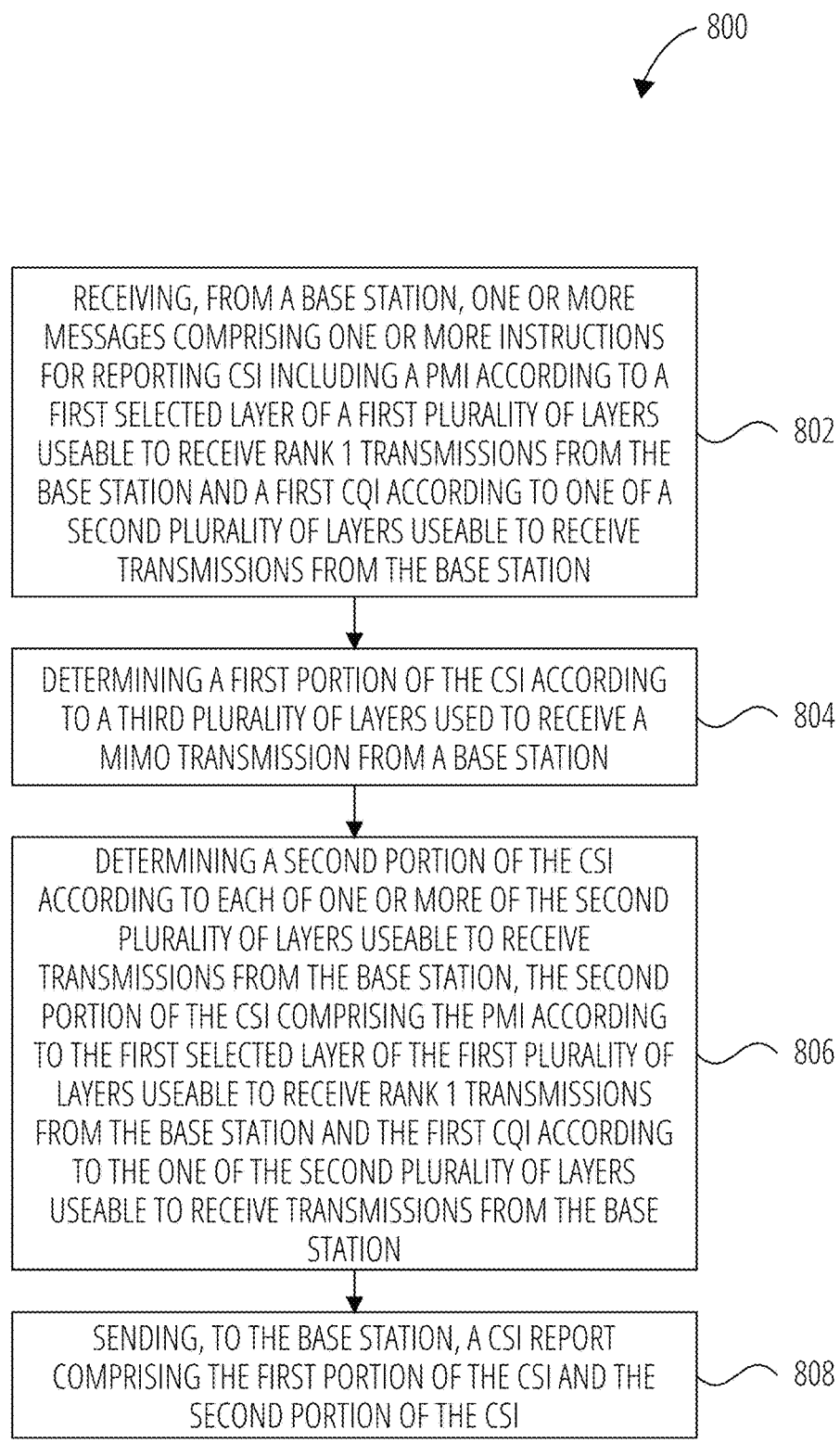
FIG. 8 illustrates a method for CSI reporting at a UE, according to an embodiment.

FIG. 8 illustrates a method 800 for CSI reporting at a UE, according to an embodiment. The method 800 includes receiving 802, from a base station, one or more messages comprising one or more instructions for reporting CSI including a PMI according to a first selected layer of a first plurality of layers useable to receive rank 1 transmissions from the base station and a first CQI according to one of a second plurality of layers useable to receive transmissions from the base station. The one or more instructions may inform the UE of the manner of reporting the first CQI (e.g., whether/for which layers to report an absolute CQI and/or differential CQI), the band applicability for the PMI and/or the CQI (e.g., whether to report for each in a subband manner and/or a wideband manner), etc. The one or more messages may be sent, for example, as common RRC signaling or in separate RRC signaling. The first plurality of layers useable to receive rank 1 transmissions from the base station may be a subset of the second plurality of layers useable to receive transmissions from the base station.

The method 800 further includes determining 804 first portion of the CSI according to a third plurality of layers used to receive a MIMO transmission from the base station. The third plurality of layers used to receive the MIMO transmission from the base station may be a subset of the second plurality of layers useable to receive transmissions from the base station.

The method 800 further includes determining 806 second portion of the CSI according to each of one or more of the second plurality of layers useable to receive transmissions from the base station, the second portion of the CSI comprising the PMI according to the first selected layer of the first plurality of layers useable to receive rank 1 transmissions from the base station and the first CQI according to the one of the second plurality of layers useable to receive transmissions from the base station.

The method 800 further includes sending 808, to the base station, a CSI report comprising the first portion of the CSI and the second portion of the CSI.

In some embodiments of the method 800, the first selected layer of the first plurality of layers useable to receive the rank 1 transmissions from the base station is a layer of the first plurality of layers useable to receive the rank 1 transmissions from the base station with a highest SINR during a transmission from the base station.

In some embodiments of the method 800, the first CQI is determined according to a layer of the second plurality of layers useable to receive the transmissions from the base station by using a precoder associated with the PMI according to the first selected layer of the first plurality of layers useable to receive the rank 1 transmissions from the base station.

In some embodiments of the method 800, the first CQI is determined according to a layer of the second plurality of layers useable to receive the transmissions from the base station by using a precoder for a second selected layer of the third plurality of layers used to receive the MIMO transmission with a highest determined SINR of the third plurality of layers used to receive the MIMO transmission as determined relative to the MIMO transmission.

In some embodiments of the method 800, the first CQI is determined according to a layer of the second plurality of layers useable to receive the transmissions from the base station using one of a precoder associated with the PMI according to the first selected layer of the first plurality of layers useable to receive the rank 1 transmissions from the base station and a precoder for a second selected layer of the third plurality of layers used to receive the MIMO transmission with a highest determined signal-to-noise ratio (SINR) of the third plurality of layers used to receive the MIMO transmission as determined relative to the MIMO transmission based on whether the first portion of the CSI comprises a LI according to the third plurality of layers used to receive the MIMO transmission from the base station.

In some embodiments of the method 800, the PMI according to the first selected layer of the first plurality of layers useable to receive the rank 1 transmissions from the base station is reported in a wideband manner.

In some embodiments of the method 800, the PMI according to the first selected layer of the first plurality of layers useable to receive the rank 1 transmissions from the base station is reported in one of a wideband manner and a subband manner according to a configuration from the base station. The configuration from the base station may have been included as part of the one or more instructions in the one or more messages.

In some embodiments of the method 800, the CSI report is sent to the base station in first and second parts on one of a long PUCCH and a PUSCH, and one of the first and second parts comprises the PMI according to the first selected layer of the first plurality of layers useable to receive the rank 1 transmissions from the base station, the first CQI, and one or more of a second CQI, a second PMI and a LI from the first portion of the CSI.

In some embodiments of the method 800, the CSI report is sent to the base station in first and second parts on one of a long PUCCH and a PUSCH, and one of the first and second parts comprises the PMI according to the first selected layer of the first plurality of layers useable to receive the rank 1 transmissions from the base station, the first CQI, and one or more of a second CQI, a CRI, and an RI from the first portion of the CSI.

Embodiments contemplated herein include an apparatus comprising means to perform one or more elements of the method 800. This apparatus may be, for example, an apparatus of a UE 1200 as described below.

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, the memory 1206 of the UE 1200 described below, and/or the peripheral devices 1504, the memory/storage devices 1514, and/or the databases 1520 of the components 1500 as described below.

Embodiments contemplated herein include an apparatus comprising logic, modules, or circuitry to perform one or more elements of the method 800. This apparatus may be, for example, an apparatus of a UE 1200 as described below.

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a UE 1200 as described below.

Embodiments contemplated herein include a signal as described in or related to one or more elements of the method 800.

Embodiments contemplated herein include a datagram, packet, frame, segment, protocol data unit (PDU), or message as described in or related to one or more elements of the method 800.

Embodiments contemplated herein include a signal encoded with data as described in or related to one or more elements of the method 800.

Embodiments contemplated herein include a signal encoded with a datagram, packet, frame, segment, PDU, or message as described in or related to one or more elements of the method 800.

Embodiments contemplated herein include an electromagnetic signal carrying computer-readable instructions, wherein execution of the computer-readable instructions by one or more processors is to cause the one or more processors to perform one or more elements of the method 800.

Embodiments contemplated herein include a computer program comprising instructions, wherein execution of the program by a processing element is to cause the processing element to carry out one or more elements of the method 800. These instructions may be, for example, the instructions processor 1508 and/or the instructions 1512 of the components 1500 as described below.

Figure 9:
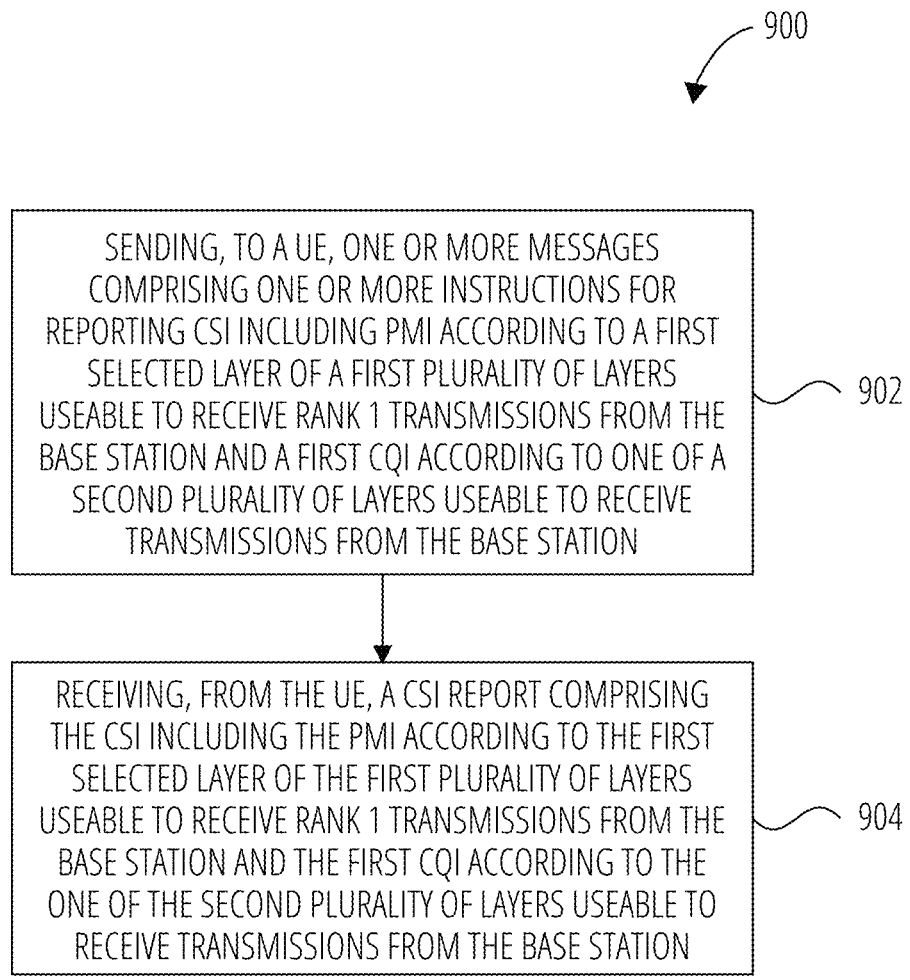
FIG. 9 illustrates a method of a base station for configuring CSI reporting at a UE, according to an embodiment.

FIG. 9 illustrates a method 900 of a base station for configuring CSI reporting at a UE, according to an embodiment. The method 900 includes sending 902, to a UE, one or more messages comprising one or more instructions for reporting CSI including a PMI according to a first selected layer of a first plurality of layers useable to receive rank 1 transmissions from the base station and a first CQI according to one of a second plurality of layers useable to receive transmissions from the base station. The one or more instructions may inform the UE of the manner of reporting the first CQI (e.g., whether/for which layers to report an absolute CQI and/or differential CQI), the band applicability for the PMI and/or the CQI (e.g., whether to report for each in a subband manner and/or a wideband manner), etc. The one or more messages may be sent, for example, as common RRC signaling or in separate RRC signaling. The base station may leave to the UE the selection of the layer according to the PMI and any further selection of the one of the plurality of the second plurality of layers useable by the UE to receive transmissions from the base station, in the manner described above. The first plurality of layers useable to receive rank 1 transmission station may be a subset of the second plurality of layers useable to receive transmissions from the base station.

The method 900 further includes receiving 904, from the UE, a CSI report comprising the CSI including the PMI according to the first selected layer of the first plurality of layers useable to receive rank 1 transmissions from the base station and the first CQI according to the one of the second plurality of layers useable to receive transmissions from the base station.

In some embodiments of the method 900, the CSI report is received from the UE in first and second parts on one of a long PUCCH and a PUSCH. In some of these embodiments, one of the first and second parts comprises the PMI according to the first selected layer of the first plurality of layers useable to receive rank 1 transmissions from the base station, the first CQI, and one or more of a second CQI, a PMI and an LI determined according to a third plurality of layers used by the UE to receive a MIMO transmission as determined relative to the MIMO transmission. In others of these embodiments, one of the first and second parts comprises the PMI according to the first selected layer of the first plurality of layers useable to receive rank 1 transmissions from the base station, the first CQI, and one or more of a second CQI, a CRI, and a RI determined according to the third plurality of layers used by the UE to receive the MIMO transmission as determined relative to the MIMO transmission. In each case, the third plurality of layers used to receive the MIMO transmission from the base station may be a subset of the second plurality of layers useable to receive transmissions from the base station.

In some embodiments of the method 900, the CSI report is received from the UE in a single part on a short PUCCH.

Embodiments contemplated herein include an apparatus comprising means to perform one or more elements of the method 900. This apparatus may be, for example, an apparatus of a network node 1300 as described below.

Embodiments contemplated herein include one or more non-transitory computer-readable media comprising instructions to cause an electronic device, upon execution of the instructions by one or more processors of the electronic device, to perform one or more elements of the method 900. This non-transitory computer-readable media may be, for example, the memory 1306 of the network node 1300 described below, and/or the peripheral devices 1504, the memory/storage devices 1514, and/or the databases 1520 of the components 1500 as described below.

Embodiments contemplated herein include an apparatus comprising logic, modules, or circuitry to perform one or more elements of the method 900. This apparatus may be, for example, an apparatus of a network node 1300 as described below.

Embodiments contemplated herein include an apparatus comprising: one or more processors and one or more computer-readable media comprising instructions that, when executed by the one or more processors, cause the one or more processors to perform one or more elements of the method 900. This apparatus may be, for example, an apparatus of a network node 1300 as described below.

Embodiments contemplated herein include a signal as described in or related to one or more elements of the method 900.

Embodiments contemplated herein include a datagram, packet, frame, segment, protocol data unit (PDU), or message as described in or related to one or more elements of the method 900.

Embodiments contemplated herein include a signal encoded with data as described in or related to one or more elements of the method 900.

Embodiments contemplated herein include a signal encoded with a datagram, packet, frame, segment, PDU, or message as described in or related to one or more elements of the method 900.

Embodiments contemplated herein include an electromagnetic signal carrying computer-readable instructions, wherein execution of the computer-readable instructions by one or more processors is to cause the one or more processors to perform one or more elements of the method 900.

Embodiments contemplated herein include a computer program comprising instructions, wherein execution of the program by a processing element is to cause the processing element to carry out one or more elements of the method 900. These instructions may be, for example, the instructions processor 1508 and/or the instructions 1512 of the components 1500 as described below.

In some instances, it may be beneficial for a base station to configure a UE to report more fulsome CSI on a plurality of ranks. For example, in the case of a base station and a UE that can communicate using up to a rank 4 transmission from the base station, it may be beneficial for the base station to configure the UE to report CSI according to multiple of a rank 1 reception at the UE, a rank 2 reception at the UE, a rank 3 reception at the UE, and a rank 4 reception at the UE. This information may allow the base station to select between the various ranks for transmission based on, for example, the data throughput available at each rank (as reflected by/determined from the reported CSI) in relation to the spatial, processing, and/or power resource usage according each rank. This CSI reporting regarding a plurality of ranks may support dynamic switching between the ranks as between the UE and the base station as these (and other related) considerations change (e.g., based on changes to the physical channel corresponding to movement of the UE).

In these cases, the UE may calculate, e.g., CRI/RI/PMI/LI/CQI for each of the ranks using the data transmission currently being sent by the base station as if such a transmission was intended by the base station to a transmission of each of those ranks (regardless of the actual rank of the current transmission as understood by the base station and/or the UE). This may be done using CSI-RS transmitted by the base station, which may not have a precoder applied at the base station and thus can be used to determine CRI/RI/PMI/LI/CQI according to multiple ranks.

A configuration message from the base station may identify the ranks which should be so reported. For example, in the case of a base station and a UE that can communicate using up to a rank 4 transmission, the configuration message may identify that the UE should report CSI for each of rank 1, rank 2, rank 3, and rank 4. It is also contemplated that a base station may identify less than all of the possible ranks for reporting. For example, the configuration message may identify that the UE should report CSI for each of rank 2 and rank 4.

In some of these cases where ranks are identified by the base station, CSI in the form of a PMI, a CQI, and an LI for each of the identified ranks may be reported. In these cases, this CSI may be reported by PUCCH or PUSCH, and such a CSI report may be sent in a single part. In these cases, this CSI may be reported in a rank interleaved manner, for example:

{PMI for the 1st rank, PMI for the 2nd rank, . . . PMI for the Kth rank, CQI for the 1st rank, CQI for the 2nd rank, . . . CQI for the Kth rank, LI for the 1st rank, LI for the 2nd rank, . . . LI for the Kth rank}

In others of these cases where ranks are identified by the base station, the CSI may be reported in a rank sequential manner, for example:

{PMI/CQI/LI for the 1st rank, PMI/CQI/LI for the 2nd rank, . . . PMI/CQI/LI for the Kth rank}

In some embodiments, a configuration message may alternatively specify a number of ranks that should be reported. In cases where the number of ranks is indicated, a UE may determine which ranks to report. This selection may correspond to the highest ranks available as between the base station and the UE. For example, in the case of a base station and a UE that can communicate using up to a rank 4 transmission where the base station has indicated CSI reporting for two ranks, the UE may determine and report on CSI according to a rank 4 transmission and a rank 3 transmission. Alternatively, this selection may correspond to the ranks with higher spectrum efficiency. For example, in the case of a base station and a UE that can communicate using up to a rank 4 transmission, the UE may determine and report on CSI according to a rank 3 and a rank 2 transmission, where the spectrum efficiency from rank 3 is the highest and that spectrum efficiency from rank 2 is the second highest.

In some of these cases where a number of ranks is identified by the base station, CSI in the form of an RI, a PMI, a CQI, and an LI for each of the ranks may be reported. In these cases, this CSI may be reported by PUCCH or PUSCH. Further, such a CSI report may be sent in a single part in the case of a short PUCCH. In these cases, this CSI may be reported in a rank interleaved manner, for example:

{RI for the 1st rank, RI for the 2nd rank, . . . RI for the Nth rank, PMI for the 1st rank, PMI for the 2nd rank, . . . PMI for the Nth rank, CQI for the 1st rank, CQI for the 2nd rank, . . . CQI for the Nth rank, LI for the 1st rank, LI for the 2nd rank, . . . LI for the Nth rank}

In others of these cases where a number of ranks is identified by the base station, the CSI may be reported in a rank sequential manner, for example:

{RI/PMI/CQI/LI for the 1st rank, RI/PMI/CQI/LI for the 2nd rank, . . . RI/PMI/CQI/LI for the Nth rank}

In some cases involving a CSI report in long PUCCH or PUSCH, the CSI for the number of ranks may instead by reported in two parts. In this case, a first part may include CQI for a first codeword according to each rank and RI for each rank. A second part may include CQI for a second codeword according to each rank (if any) and PMI and LI for each rank. The information in each part may be reported in either a rank interleaved manner, for example:

First part: {CQI 1st codeword for the 1st rank; CQI 1st codeword for the 2nd rank; . . . CQI 1st codeword for the Nth rank, RI for the 1st rank; RI for the 2nd rank; . . . RI for the Nth rank}

Second part: {CQI 2nd codeword for the 1st rank; CQI 2nd codeword for the 2nd rank; . . . CQI 2nd codeword for the Nth rank, PMI for the 1st rank; PMI for the 2nd rank; . . . PMI for the Nth rank, LI for the 1st rank; LI for the 2nd rank; . . . LI for the Nth rank}

Alternatively, the information in each part may be reported in a rank sequential manner, for example:

First part: {CQI 1st codeword/RI for the 1st rank; CQI 1st codeword/RI for the 2nd rank; . . . CQI 1st codeword/RI for the Nth rank}

Second part: {CQI 2nd codeword/PMI/LI for the 1st rank; CQI 2nd codeword/PMI/LI for the 2nd rank; . . . CQI 2nd codeword/PMI/LI for the Nth rank}

In cases where the base station has configured the UE to report more fulsome CSI on a plurality of ranks, it may further configure the UE, for one or more of the ranks, whether to report for each rank in a wideband manner (e.g., over the entire BWP used for transmission) or a subband manner (e.g., over one or more subbands of the BWP used for transmission). Alternatively, the decision between wideband/subband for one or more of the ranks may be performed by the UE and, in some cases, indicated back to the base station.

Under one option, the CSI reported for each rank is all reported in a wideband manner. Under a second option, the CSI for one reported rank may be reported in a subband manner, with the CSI for the rest of the reported ranks being reported in a wideband manner. This mixture may be configured to account for the fact that additional processing/signaling/time associated with subband type reports may be required, but that conditions dictate that such additional processing/signaling is worth it in relation to at least one rank. Under a third option, the base station may configure (or the UE may decide), for each rank, whether CSI for that rank should be reported in a subband manner or in a wideband manner.

Figure 10:
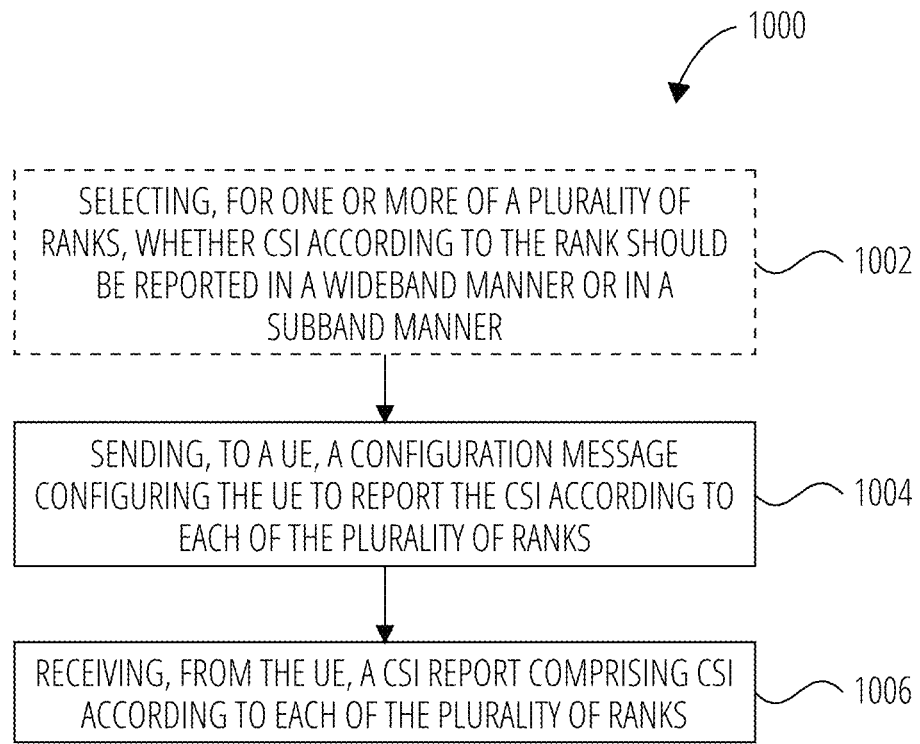
FIG. 10 illustrates a method of a base station for CSI reporting, according to an embodiment.

FIG. 10 illustrates a method of a base station for CSI reporting, according to an embodiment. The method 1000 optionally includes selecting 1002 selecting, for one or more of a plurality of ranks, whether CSI according to the rank should be reported in a wideband manner or in a subband manner.

The method 1000 further includes sending 1004, to a UE, a configuration message configuring the UE to report the CSI according to each of the plurality of ranks. In the case that the selecting 1002 was performed, the configuration may include a selection of whether the CSI for each respective rank should be reported in the wideband manner or in the subband manner.

The method 1000 further includes receiving 1006, from the UE, a CSI report comprising CSI according to each of the plurality of ranks.

In some embodiments of the method 1000, the CSI according to each of the plurality of ranks is received in the CSI report in a rank interleaved manner.

In some embodiments of the method 1000, the CSI according to each of the plurality of ranks is received in the CSI report in a rank sequential manner.

In some embodiments of the method 1000, the configuration message identifies each of the plurality of ranks.

In some embodiments of the method 1000, the configuration message indicates a number of the plurality of ranks.

In some embodiments of the method 1000, the CSI report is received at the base station in first and second parts on one of a long PUCCH and a PUSCH.

Embodiments contemplated herein include an apparatus comprising means to perform one or more elements of the method 1000. This apparatus may be, for example, an apparatus of a network node 1300 as described below.

Embodiments contemplated herein include one or more non-transitory computer-readable media comprising instructions to cause an electronic device, upon execution of the instructions by one or more processors of the electronic device, to perform one or more elements of the method 1000. This non-transitory computer-readable media may be, for example, the memory 1306 of the network node 1300 described below, and/or the peripheral devices 1504, the memory/storage devices 1514, and/or the databases 1520 of the components 1500 as described below.

Embodiments contemplated herein include an apparatus comprising logic, modules, or circuitry to perform one or more elements of the method 1000. This apparatus may be, for example, an apparatus of a network node 1300 as described below.

Embodiments contemplated herein include an apparatus comprising: one or more processors and one or more computer-readable media comprising instructions that, when executed by the one or more processors, cause the one or more processors to perform one or more elements of the method 1000. This apparatus may be, for example, an apparatus of a network node 1300 as described below.

Embodiments contemplated herein include a signal as described in or related to one or more elements of the method 1000.

Embodiments contemplated herein include a datagram, packet, frame, segment, protocol data unit (PDU), or message as described in or related to one or more elements of the method 1000.

Embodiments contemplated herein include a signal encoded with data as described in or related to one or more elements of the method 1000.

Embodiments contemplated herein include a signal encoded with a datagram, packet, frame, segment, PDU, or message as described in or related to one or more elements of the method 1000.

Embodiments contemplated herein include an electromagnetic signal carrying computer-readable instructions, wherein execution of the computer-readable instructions by one or more processors is to cause the one or more processors to perform one or more elements of the method 1000.

Embodiments contemplated herein include a computer program comprising instructions, wherein execution of the program by a processing element is to cause the processing element to carry out one or more elements of the method 1000. These instructions may be, for example, the instructions processor 1508 and/or the instructions 1512 of the components 1500 as described below.

Figure 11:
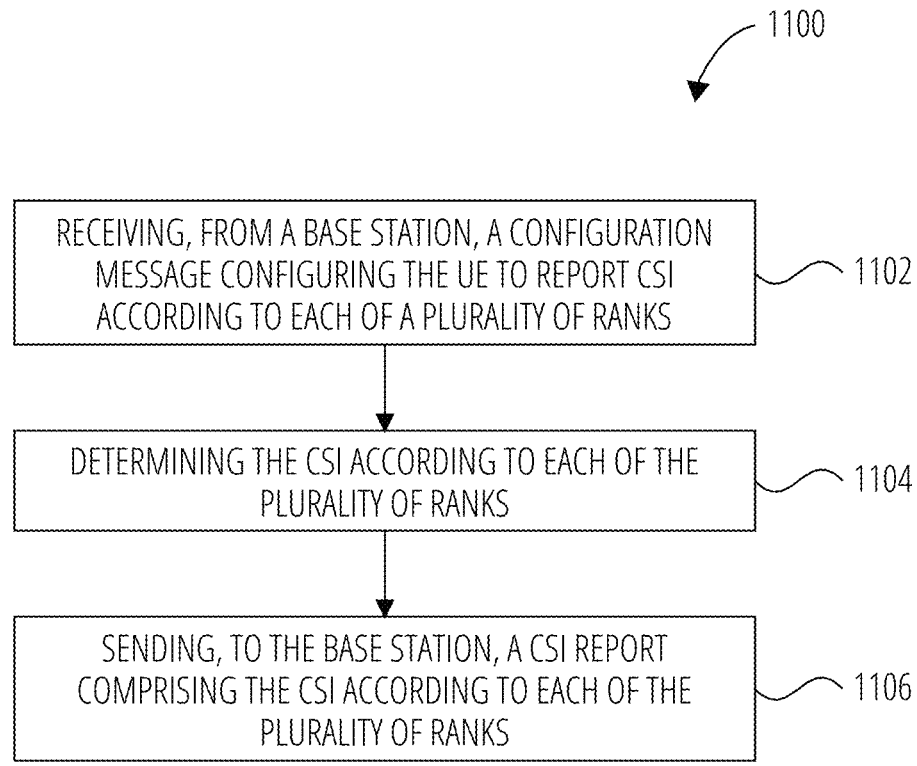
FIG. 11 illustrates a method of a UE for performing CSI reporting, according to an embodiment.

FIG. 11 illustrates a method of a UE for performing CSI reporting, according to an embodiment. The method 1100 includes receiving 1102, from a base station, a configuration message configuring the UE to report CSI according to each of a plurality of ranks.

The method 1100 further includes determining 1104 the CSI according to each of the plurality of ranks.

The method 1100 further includes sending 1106, to the base station, a CSI report comprising CSI according to each of the plurality of ranks.

In some embodiments of the method 1100, the CSI according to each of the plurality of ranks is sent in the CSI report in a rank interleaved manner.

In some embodiments of the method 1100, the CSI according to each of the plurality of ranks is sent in the CSI report in a rank sequential manner.

In some embodiments of the method 1100, the configuration message identifies each of the plurality of ranks.

In some embodiments of the method 1100, the configuration message indicates a number of the plurality of ranks.

In some embodiments of the method 1100, the CSI report is sent to the base station in first and second parts on one of a long PUCCH and a physical uplink shared channel PUSCH.

In some embodiments of the method 1100, the UE selects one of the plurality of ranks to report in a subband manner.

Embodiments contemplated herein include an apparatus comprising means to perform one or more elements of the method 1100. This apparatus may be, for example, an apparatus of a UE 1200 as described below.

Embodiments contemplated herein include one or more non-transitory computer-readable media comprising instructions to cause an electronic device, upon execution of the instructions by one or more processors of the electronic device, to perform one or more elements of the method 1100. This non-transitory computer-readable media may be, for example, the memory 1206 of the UE 1200 described below, and/or the peripheral devices 1504, the memory/storage devices 1514, and/or the databases 1520 of the components 1500 as described below.

Embodiments contemplated herein include an apparatus comprising logic, modules, or circuitry to perform one or more elements of the method 1100. This apparatus may be, for example, an apparatus of a UE 1200 as described below.

Embodiments contemplated herein include an apparatus comprising: one or more processors and one or more computer-readable media comprising instructions that, when executed by the one or more processors, cause the one or more processors to perform one or more elements of the method 1100. This apparatus may be, for example, an apparatus of a UE 1200 as described below.

Embodiments contemplated herein include a signal as described in or related to one or more elements of the method 1100.

Embodiments contemplated herein include a datagram, packet, frame, segment, protocol data unit (PDU), or message as described in or related to one or more elements of the method 1100.

Embodiments contemplated herein include a signal encoded with data as described in or related to one or more elements of the method 1100.

Embodiments contemplated herein include a signal encoded with a datagram, packet, frame, segment, PDU, or message as described in or related to one or more elements of the method 1100.

Embodiments contemplated herein include an electromagnetic signal carrying computer-readable instructions, wherein execution of the computer-readable instructions by one or more processors is to cause the one or more processors to perform one or more elements of the method 1100.

Embodiments contemplated herein include a computer program comprising instructions, wherein execution of the program by a processing element is to cause the processing element to carry out one or more elements of the method 1100. These instructions may be, for example, the instructions processor 1508 and/or the instructions 1512 of the components 1500 as described below.

Figure 12:
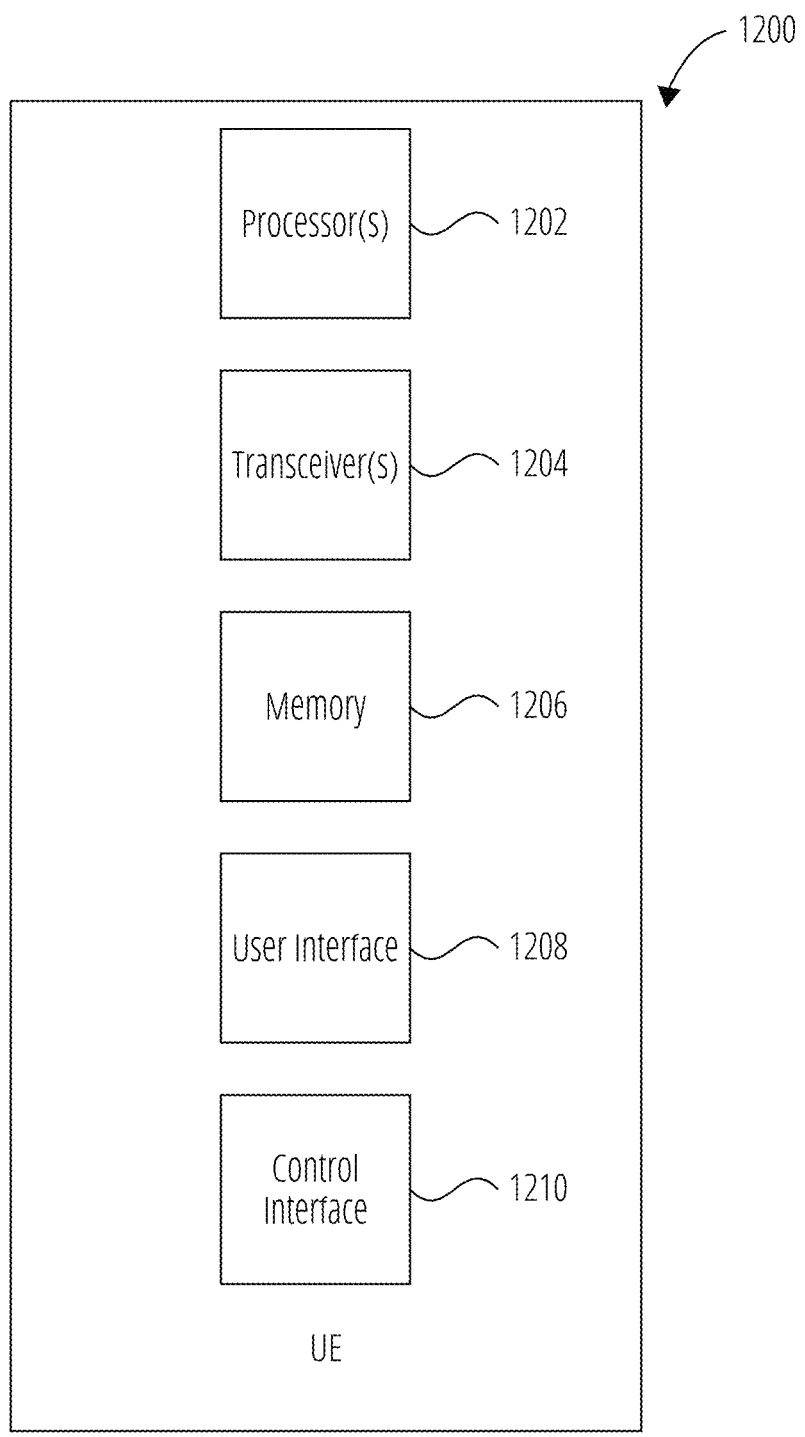
FIG. 12 illustrates a UE in accordance with one embodiment.

FIG. 12 is a block diagram of an example UE 1200 configurable according to various embodiments of the present disclosure, including by execution of instructions on a computer-readable medium that correspond to any of the example methods and/or procedures described herein. The UE 1200 comprises one or more processor 1202, transceiver 1204, memory 1206, user interface 1208, and control interface 1210.

The one or more processor 1202 may include, for example, an application processor, an audio digital signal processor, a central processing unit, and/or one or more baseband processors. Each of the one or more processor 1202 may include internal memory and/or may include interface(s) to communication with external memory (including the memory 1206). The internal or external memory can store software code, programs, and/or instructions for execution by the one or more processor 1202 to configure and/or facilitate the UE 1200 to perform various operations, including operations described herein. For example, execution of the instructions can configure the UE 1200 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1204, user interface 1208, and/or control interface 1210. As another example, the one or more processor 1202 may execute program code stored in the memory 1206 or other memory that corresponds to MAC, RLC, PDCP, and RRC layer protocols standardized by 3GPP (e.g., for NR and/or LTE). As a further example, the processor 1202 may execute program code stored in the memory 1206 or other memory that, together with the one or more transceiver 1204, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1206 may comprise memory area for the one or more processor 1202 to store variables used in protocols, configuration, control, and other functions of the UE 1200, including operations corresponding to, or comprising, any of the example methods and/or procedures described herein. Moreover, the memory 1206 may comprise non-volatile memory (e.g., flash memory), volatile memory (e.g., static or dynamic RAM), or a combination thereof. Furthermore, the memory 1206 may interface with a memory slot by which removable memory cards in one or more formats (e.g., SD Card, Memory Stick, Compact Flash, etc.) can be inserted and removed.

The one or more transceiver 1204 may include radio-frequency transmitter and/or receiver circuitry that facilitates the UE 1200 to communicate with other equipment supporting like wireless communication standards and/or protocols. For example, the one or more transceiver 1204 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1202. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1204 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 1202 to implement a PHY layer based on OFDM, OFDMA, and/or SC-FDMA technologies, such as described herein with respect to other figures.

The user interface 1208 may take various forms depending on particular embodiments, or can be absent from the UE 1200. In some embodiments, the user interface 1208 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 may comprise a tablet computing device including a larger touchscreen display. In such embodiments, one or more of the mechanical features of the user interface 1208 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1200 having a touch screen display are capable of receiving user inputs, such as inputs related to exemplary methods and/or procedures described herein or otherwise known to persons of ordinary skill in the art.

In some exemplary embodiments of the present disclosure, the UE 1200 may include an orientation sensor, which can be used in various ways by features and functions of the UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1210 may take various forms depending on particular embodiments. For example, the control interface 1210 may include an RS-232 interface, an RS-485 interface, a USB interface, an HDMI interface, a Bluetooth interface, an IEEE ("Firewire") interface, an I2C interface, a PCMCIA interface, or the like. In some exemplary embodiments of the present disclosure, control interface 1260 can comprise an IEEE 802.3 Ethernet interface such as described above. In some embodiments of the present disclosure, the control interface 1210 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1200 may include more functionality than is shown in FIG. 12 including, for example, a video and/or still-image camera, microphone, media player and/or recorder, etc. Moreover, the one or more transceiver 1204 may include circuitry for communication using additional radio-frequency communication standards including Bluetooth, GPS, and/or others. Moreover, the one or more processor 1202 may execute software code stored in the memory 1206 to control such additional functionality. For example, directional velocity and/or position estimates output from a GPS receiver can be available to any application program executing on the UE 1200, including various exemplary methods and/or computer-readable media according to various exemplary embodiments of the present disclosure.

Figure 13:
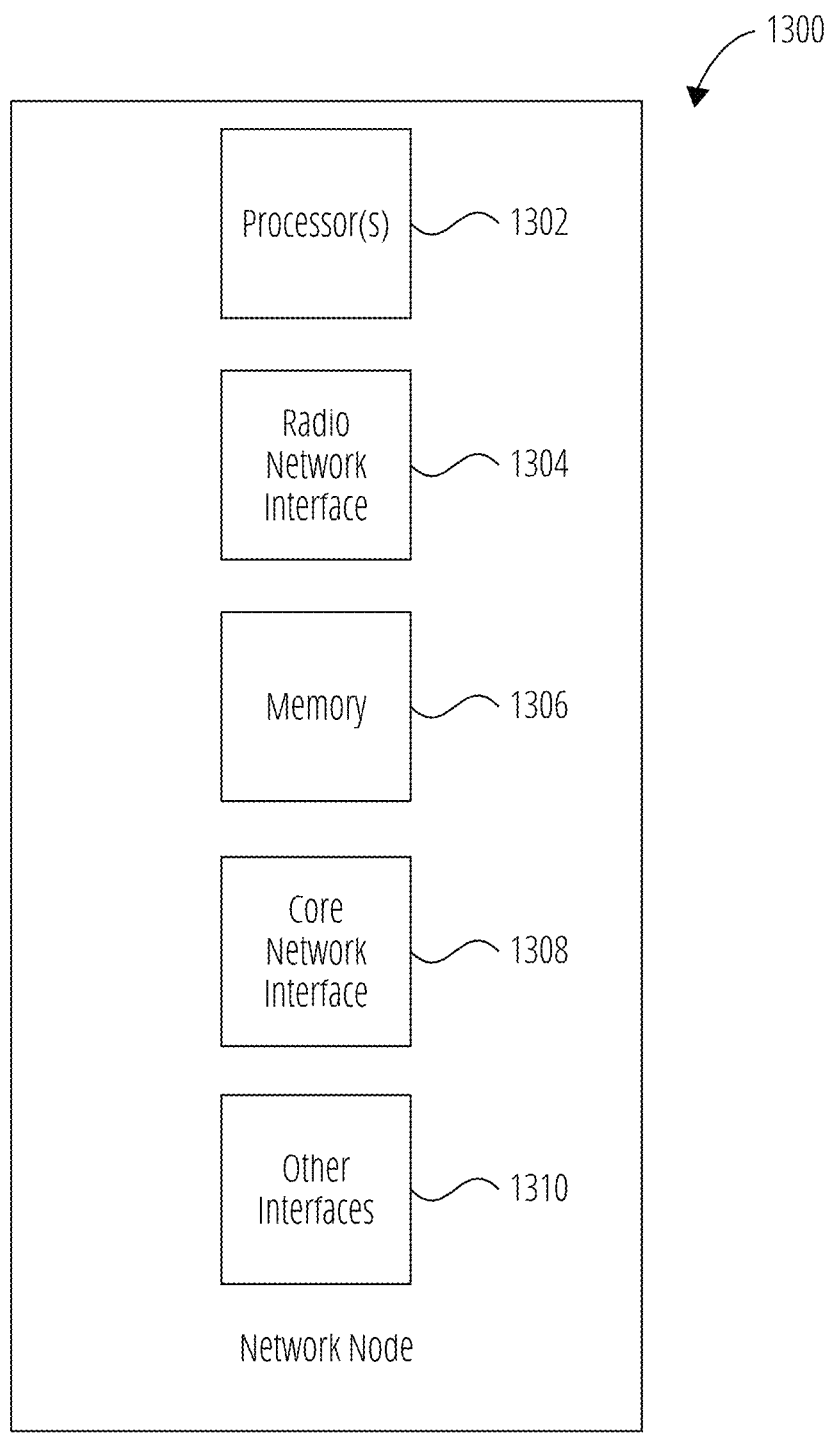
FIG. 13 illustrates a network node in accordance with one embodiment.

FIG. 13 is a block diagram of an example network node 1300 configurable according to various embodiments of the present disclosure, including by execution of instructions on a computer-readable medium that correspond to any of the example methods and/or procedures described herein.

The network node 1300 includes a one or more processor 1302, a radio network interface 1304, a memory 1306, a core network interface 1308, and other interfaces 1310. The network node 1300 may comprise, for example, a base station, eNB, gNB, access node, or component thereof.

The one or more processor 1302 may include any type of processor or processing circuitry and may be configured to perform any of the methods or procedures disclosed herein. The memory 1306 may store software code, programs, and/or instructions executed by the one or more processor 1302 to configure the network node 1300 to perform various operations, including operations described herein. For example, execution of such stored instructions can configure the network node 1300 to communicate with one or more other devices using protocols according to various embodiments of the present disclosure, including one or more methods and/or procedures discussed above. Furthermore, execution of such stored instructions can also configure and/or facilitate the network node 1300 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1304 and the core network interface 1308. By way of example and without limitation, the core network interface 1308 comprise an S1 interface and the radio network interface 1304 may comprise a Uu interface, as standardized by 3GPP. The memory 1306 may also store variables used in protocols, configuration, control, and other functions of the network node 1300. As such, the memory 1306 may comprise non-volatile memory (e.g., flash memory, hard disk, etc.), volatile memory (e.g., static or dynamic RAM), network-based (e.g., "cloud") storage, or a combination thereof.

The radio network interface 1304 may include transmitters, receivers, signal processors, ASICs, antennas, beamforming units, and other circuitry that enables network node 1300 to communicate with other equipment such as, in some embodiments, a plurality of compatible user equipment (UE). In some embodiments, the network node 1300 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1304 may include a PHY layer based on OFDM, OFDMA, and/or SC-FDMA technologies. In some embodiments, the functionality of such a PHY layer can be provided cooperatively by the radio network interface 1304 and the one or more processor 1302.

The core network interface 1308 may include transmitters, receivers, and other circuitry that enables the network node 1300 to communicate with other equipment in a core network such as, in some embodiments, circuit-switched (CS) and/or packet-switched Core (PS) networks. In some embodiments, the core network interface 1308 may include the S1 interface standardized by 3GPP. In some embodiments, the core network interface 1308 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1308 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1310 may include transmitters, receivers, and other circuitry that enables the network node 1300 to communicate with external networks, computers, databases, and the like for purposes of operations, administration, and maintenance of the network node 1300 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 14:
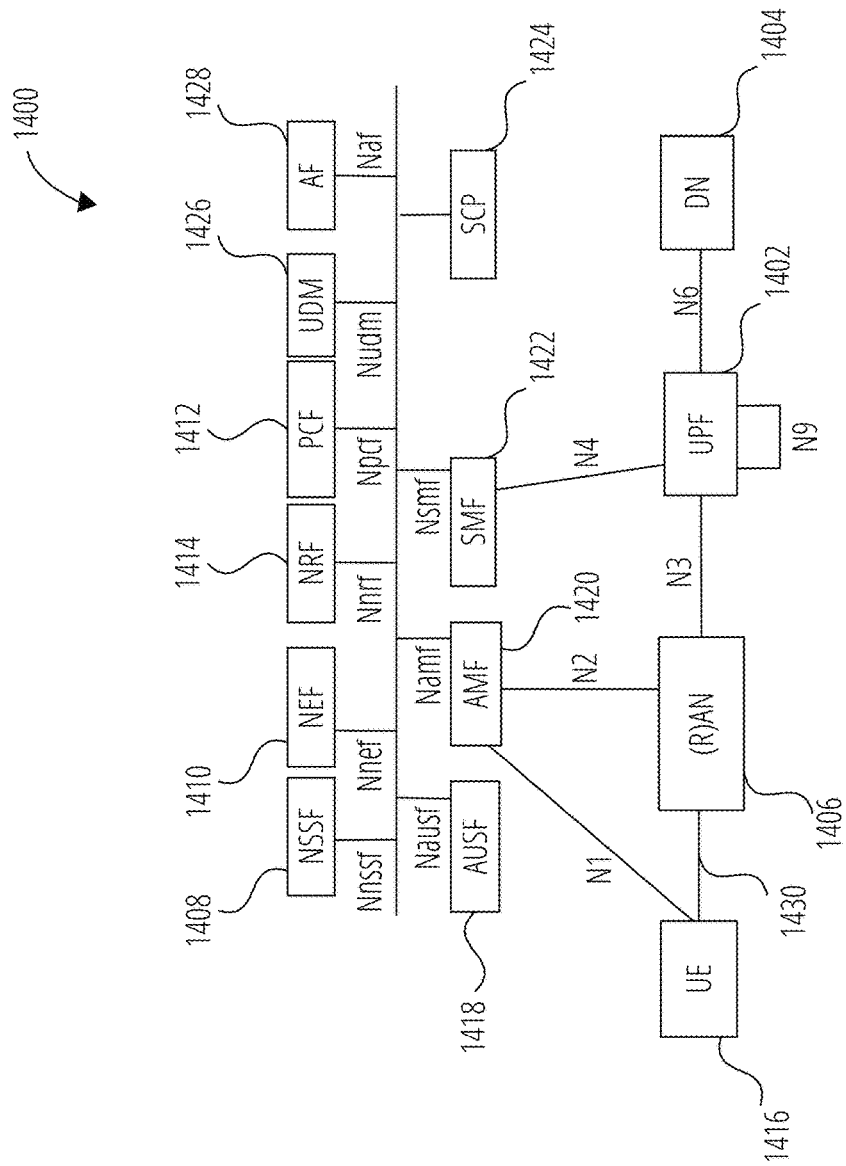
FIG. 14 illustrates an example service based architecture in accordance with certain embodiments.

FIG. 14 illustrates a service based architecture 1400 in 5GS according to one embodiment. As described in 3GPP TS 23.501, the service based architecture 1400 comprises NFs such as an NSSF 1408, a NEF 1410, an NRF 1414, a PCF 1412, a UDM 1426, an AUSF 1418, an AMF 1420, an SMF 1422, for communication with a UE 1416, a (R)AN 1406, a UPF 1402, and a DN 1404. The NFs and NF services can communicate directly, referred to as Direct Communication, or indirectly via a SCP 1424, referred to as Indirect Communication. FIG. 14 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 14 are described below.

The NSSF 1408 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1410 supports exposure of capabilities and events. NF capabilities and events may be securely exposed by the NEF 1410 (e.g., for 3rd party, Application Functions, and/or Edge Computing). The NEF 1410 may store/retrieve information as structured data using a standardized interface (Nudr) to a UDR. The NEF 1410 may also secure provision of information from an external application to 3GPP network and may provide for the Application Functions to securely provide information to the 3GPP network (e.g., expected UE behavior, 5GLAN group information, and service specific information), wherein the NEF 1410 may authenticate and authorize and assist in throttling the Application Functions. The NEF 1410 may provide translation of internal-external information by translating between information exchanged with the AF 1428 and information exchanged with the internal network function. For example, the NEF 1410 translates between an AF-Service-Identifier and internal 5G Core information such as DNN and S-NSSAI. The NEF 1410 may handle masking of network and user sensitive information to external AF's according to the network policy. The NEF 1410 may receive information from other network functions (based on exposed capabilities of other network functions), and stores the received information as structured data using a standardized interface to a UDR. The stored information can be accessed and re-exposed by the NEF 1410 to other network functions and Application Functions, and used for other purposes such as analytics. For external exposure of services related to specific UE(s), the NEF 1410 may reside in the HPLMN. Depending on operator agreements, the NEF 1410 in the HPLMN may have interface(s) with NF(s) in the VPLMN. When a UE is capable of switching between EPC and 5GC, an SCEF+NEF may be used for service exposure.

The NRF 1414 supports service discovery function by receiving an NF Discovery Request from an NF instance or SCP and providing the information of the discovered NF instances to the NF instance or SCP. The NRF 1414 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1412 supports a unified policy framework to govern network behavior. The PCF 1412 provides policy rules to Control Plane function(s) to enforce them. The PCF 1412 accesses subscription information relevant for policy decisions in a Unified Data Repository (UDR). The PCF 1412 may access the UDR located in the same PLMN as the PCF.

The UDM 1426 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1426 uses subscription data (including authentication data) that may be stored in a UDR, in which case a UDM implements the application logic and may not require an internal user data storage and several different UDMs may serve the same user in different transactions. The UDM 1426 may be located in the HPLMN of the subscribers it serves, and may access the information of the UDR located in the same PLMN.

The AUSF 1418 supports authentication for 3GPP access and untrusted non-3GPP access. The AUSF 1418 may also provide support for Network Slice-Specific Authentication and Authorization.

The AMF 1420 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1420. Regardless of the number of Network functions, in certain embodiments there is only one NAS interface instance per access network between the UE and the CN, terminated at one of the Network functions that implements at least NAS security and Mobility Management. The AMF 1420 may also include policy related functionalities.

In addition to the functionalities described above, the AMF 1420 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1422 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1422 may include policy related functionalities.

The SCP 1424 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1424 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1416 may include a device with radio communication capabilities. For example, the UE 1416 may comprise a smartphone (e.g., handheld touchscreen mobile computing devices connectable to one or more cellular networks). The UE 1416 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1416 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1416 may be configured to connect or communicatively couple with the (R)AN 1406 through a radio interface 1430, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1416 and the (R)AN 1406 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 1406 to the UE 1416 and a UL transmission may be from the UE 1416 to the (R)AN 1406. The UE 1416 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1406 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1406 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1406) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1416 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1402 may act as an anchor point for intra-RAT and inter-RAT mobility, an external PDU session point of interconnect to the DN 1404, and a branching point to support multi-homed PDU session. The UPF 1402 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1402 may include an uplink classifier to support routing traffic flows to a data network. The DN 1404 may represent various network operator services, Internet access, or third party services. The DN 1404 may include, for example, an application server.

Figure 15:
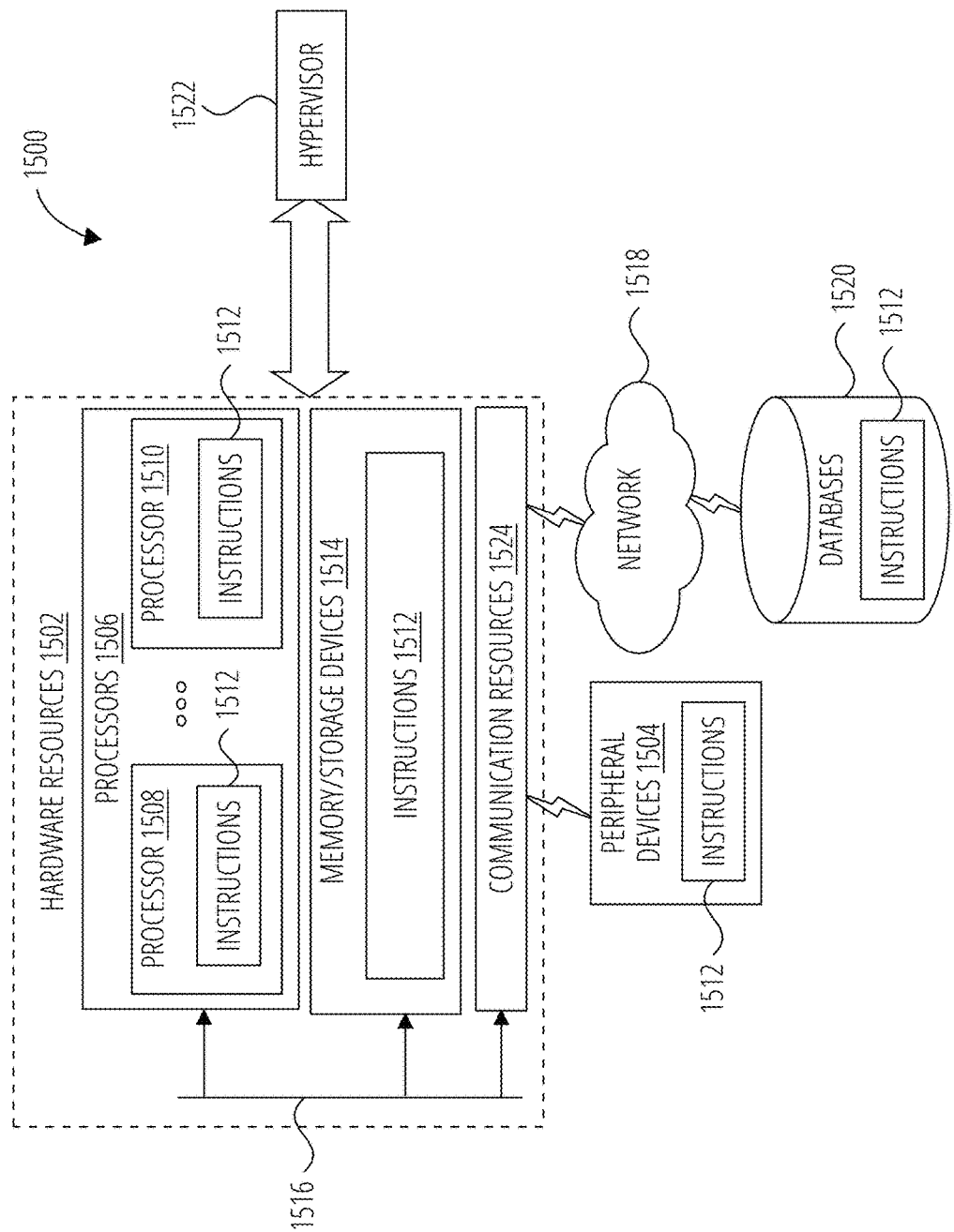
FIG. 15 illustrates components in accordance with one embodiment.

FIG. 15 is a block diagram illustrating components 1500, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1502 including one or more processors 1506 (or processor cores), one or more memory/storage devices 1514, and one or more communication resources 1524, each of which may be communicatively coupled via a bus 1516. For embodiments where node virtualization (e.g., NFV) is utilized, a hypervisor 1522 may be executed to provide an execution environment for one or more network slices/sub-slices to utilize the hardware resources 1502.

The processors 1506 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1508 and a processor 1510.

The memory/storage devices 1514 may include main memory, disk storage, or any suitable combination thereof. The memory/storage devices 1514 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1524 may include interconnection or network interface components or other suitable devices to communicate with one or more peripheral devices 1504 or one or more databases 1520 via a network 1518. For example, the communication resources 1524 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1512 may comprise software, a program, an application, an applet, an app, or other executable code for causing at least any of the processors 1506 to perform any one or more of the methodologies discussed herein. The instructions 1512 may reside, completely or partially, within at least one of the processors 1506 (e.g., within the processor's cache memory), the memory/storage devices 1514, or any suitable combination thereof. Furthermore, any portion of the instructions 1512 may be transferred to the hardware resources 1502 from any combination of the peripheral devices 1504 or the databases 1520. Accordingly, the memory of the processors 1506, the memory/storage devices 1514, the peripheral devices 1504, and the databases 1520 are examples of computer-readable and machine-readable media.

For one or more embodiments, at least one of the components set forth in one or more of the preceding figures may be configured to perform one or more operations, techniques, processes, and/or methods as set forth in the as described herein. For example, baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the embodiments described herein.

Any of the above described embodiments may be combined with any other embodiment (or combination of embodiment), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a base station for performing channel state information (CSI) reporting, comprising:
    selecting, for one or more of a plurality of ranks, whether CSI according to the rank is reported in a wideband manner or in a subband manner;
    sending, to a user equipment (UE), a configuration message configuring the UE to report CSI according to each of the plurality of ranks, wherein the configuration message includes a selection of whether the CSI for each respective rank of the one or more of the plurality of ranks should be reported in the wideband manner or in the subband manner; and
    receiving, from the UE, a CSI report comprising the CSI according to each of the plurality of ranks.

2. The method of claim 1, wherein the CSI according to each of the plurality of ranks is received in the CSI report in a rank interleaved manner.

3. The method of claim 1, wherein the CSI according to each of the plurality of ranks is received in the CSI report in a rank sequential manner.

4. The method of claim 1, wherein the configuration message identifies each of the plurality of ranks.

5. The method of claim 1, wherein the configuration message indicates a value representing a number of the plurality of ranks.

6. The method of claim 1, wherein the CSI report is received at the base station in first and second parts on one of a long physical uplink control channel (PUCCH) and a physical uplink shared channel (PUSCH).

7. A user equipment (UE) to perform channel state information (CSI) reporting, comprising:
    a transceiver to receive, from a base station, a configuration message configuring the UE to report CSI according to each of a plurality of ranks, wherein the configuration message includes a selection of whether the CSI for each respective rank of one or more of the plurality of ranks is reported in a wideband manner or in a subband manner; and
    a processor to determine the CSI according to each of the plurality of ranks,
    wherein the transceiver is further to send, to the base station, a CSI report comprising the CSI according to each of the plurality of ranks.

8. The UE of claim 7, wherein the CSI according to each of the plurality of ranks is sent in the CSI report in a rank interleaved manner.

9. The UE of claim 7, wherein the CSI according to each of the plurality of ranks is sent in the CSI report in a rank sequential manner.

10. The UE of claim 7, wherein the configuration message identifies each of the plurality of ranks.

11. The UE of claim 7, wherein the configuration message indicates a value representing a number of the plurality of ranks.

12. The UE of claim 7, wherein the CSI report is sent to the base station in first and second parts on one of a long physical uplink control channel (PUCCH) and a physical uplink shared channel (PUSCH).

13. The UE of claim 7, wherein the UE selects one of the plurality of ranks to report in a subband manner.

14. A method of a user equipment (UE) for performing channel state information (CSI) reporting, comprising:
    receiving, from a base station, a configuration message configuring the UE to report CSI according to each of a plurality of ranks, wherein the configuration message includes a selection of whether CSI for each respective rank of one or more of the plurality of ranks is reported in a wideband manner or in a subband manner;
    determining the CSI according to each of the plurality of ranks; and
    sending, to the base station, a CSI report comprising the CSI according to each of the plurality of ranks.

15. The method of claim 14, wherein the CSI according to each of the plurality of ranks is sent in the CSI report in a rank interleaved manner.

16. The method of claim 14, wherein the CSI according to each of the plurality of ranks is sent in the CSI report in a rank sequential manner.

17. The method of claim 14, wherein the configuration message identifies each of the plurality of ranks.

18. The method of claim 14, wherein the configuration message indicates a value representing a number of the plurality of ranks.

19. The method of claim 14, wherein the CSI report is sent to the base station in first and second parts on one of a long physical uplink control channel (PUCCH) and a physical uplink shared channel (PUSCH).

* * * * *